US011844067B2

(12) United States Patent
Ibrahim et al.

(10) Patent No.: US 11,844,067 B2
(45) Date of Patent: Dec. 12, 2023

(54) ENHANCED SIDELINK SLOT FORMAT CONFIGURATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Seyedkianoush Hosseini, San Diego, CA (US); Ahmed Attia Abotabl, San Diego, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 17/383,311

(22) Filed: Jul. 22, 2021

(65) Prior Publication Data

US 2023/0028810 A1    Jan. 26, 2023

(51) Int. Cl.
*H04W 72/1268* (2023.01)
*H04W 72/0446* (2023.01)
*H04L 1/1867* (2023.01)
*H04W 72/02* (2009.01)
*H04W 72/23* (2023.01)

(52) U.S. Cl.
CPC ....... *H04W 72/1268* (2013.01); *H04L 1/1896* (2013.01); *H04W 72/02* (2013.01); *H04W 72/0446* (2013.01); *H04W 72/23* (2023.01)

(58) Field of Classification Search
CPC . H04W 72/1268; H04W 72/23; H04W 72/02; H04W 72/0446; H04L 1/1896
See application file for complete search history.

(56) References Cited

U.S. PATENT DOCUMENTS

| | | | |
|---|---|---|---|
| 2020/0146058 A1* | 5/2020 | Xu | H04L 5/0037 |
| 2020/0351833 A1* | 11/2020 | Chae | H04W 72/04 |
| 2021/0136802 A1* | 5/2021 | Cirik | H04B 7/0695 |
| 2021/0227517 A1* | 7/2021 | Yi | H04W 72/23 |
| 2021/0336728 A1* | 10/2021 | Selvanesan | H04L 1/1861 |
| 2021/0360624 A1* | 11/2021 | Zhang | H04L 5/0055 |
| 2021/0377943 A1* | 12/2021 | Park | H04W 72/0453 |
| 2022/0248451 A1* | 8/2022 | Maaref | H04W 72/23 |
| 2022/0369149 A1* | 11/2022 | Xu | H04W 24/10 |

* cited by examiner

*Primary Examiner* — Jael M Ulysse
(74) *Attorney, Agent, or Firm* — Arun Swain

(57) ABSTRACT

Methods, systems, and devices for wireless communication at a first user equipment (UE) are described. A UE may receive a control signal indicating a set of durations. A duration of the set of durations may be scheduled for uplink resources and additional resources including downlink resources, flexible resources, or both. The UE may further receive an indication of a slot format configuration permitting sidelink communications on the uplink resources during the duration scheduled for the uplink resources and the additional resources. Upon identifying that sidelink communications are permitted, the UE may transmit a sidelink transmission using the uplink resources and during the duration.

30 Claims, 17 Drawing Sheets

— Uplink Slot 325

— Downlink + Uplink Slot 330

— Downlink Slot 335

— Flexible Slot 340

— Flexible + Uplink Slot 345

300

— Slots indicated using common slot formation configuration 405

— Slots indicated using dedicated slot formation configuration 410

400

ENHANCED SIDELINK SLOT FORMAT CONFIGURATION

TECHNICAL FIELD

The following relates to wireless communication related to sidelink resource allocation, including enhanced sidelink slot format configuration.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may configure UEs for sidelink transmission. The base station may configure time and frequency resources for the UEs to perform the sidelink transmission. In some examples, the base station may indicate that the sidelink transmission is permitted on slots scheduled for uplink resources. Some UEs, however, may support complex slot structures and may be capable of transmitting and receiving during the same time and frequency resource. Thus, with increased complexity for slot structures, some sidelink transmission techniques may be deficient.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a first user equipment (UE). The method includes receiving, from a base station, a control signal indicating a set of durations, in which a duration of the set of durations is scheduled for uplink resources and additional resources, receiving, from the base station, an indication of a slot format configuration permitting sidelink communications on the uplink resources during the duration scheduled for the uplink resources and the additional resources, and transmitting, to a second UE using the uplink resources and during the duration, a sidelink transmission based on the slot format configuration.

Another innovative aspect of the subject matter described in this disclosure can be implemented in an apparatus for wireless communication at a first UE. The apparatus may include a processor, memory coupled with the processor, and instructions stored in the memory. The instructions may be executable by the processor to cause the apparatus to receive, from a base station, a control signal indicating a set of durations, in which a duration of the set of durations is scheduled for uplink resources and additional resources, receive, from the base station, an indication of a slot format configuration permitting sidelink communications on the uplink resources during the duration scheduled for the uplink resources and the additional resources, and transmit, to a second UE using the uplink resources and during the duration, a sidelink transmission based on the slot format configuration.

Another innovative aspect of the subject matter described in this disclosure can be implemented in an apparatus for wireless communication at a first UE. The apparatus may include means for receiving, from a base station, a control signal indicating a set of durations, in which a duration of the set of durations is scheduled for uplink resources and additional resources, means for receiving, from the base station, an indication of a slot format configuration permitting sidelink communications on the uplink resources during the duration scheduled for the uplink resources and the additional resources, and means for transmitting, to a second UE using the uplink resources and during the duration, a sidelink transmission based on the slot format configuration.

Another innovative aspect of the subject matter described in this disclosure can be implemented in a non-transitory computer-readable medium storing code for wireless communication at a first UE. The code may include instructions executable by a processor to receive, from a base station, a control signal indicating a set of durations, in which a duration of the set of durations is scheduled for uplink resources and additional resources, receive, from the base station, an indication of a slot format configuration permitting sidelink communications on the uplink resources during the duration scheduled for the uplink resources and the additional resources, and transmit, to a second UE using the uplink resources and during the duration, a sidelink transmission based on the slot format configuration.

In some examples of the method, apparatuses, and non-transitory computer-readable medium described herein, receiving the indication of the slot format configuration may include operations, features, means, or instructions for receiving, from the base station, an indication of a common slot format configuration permitting the sidelink communications on a subset of the set of durations including the duration based on an uplink bandwidth scheduled for the subset of the set of durations satisfying a sidelink bandwidth threshold. Some examples of the method, apparatuses, and non-transitory computer-readable medium described herein may further include operations, features, means, or instructions for transmitting, to the base station, an indication of a set of multiple sidelink identifiers associated with a set of UEs including the first UE and the second UE, in which receiving the indication of the slot format configuration may be based on the indication of the set of multiple sidelink identifiers.

Some examples of the method, apparatuses, and non-transitory computer-readable medium described herein may further include operations, features, means, or instructions for receiving, from the base station, an indication of a common slot format configuration for a first set of feedback occasions and an indication of a dedicated slot format configuration for a second set of feedback occasions and transmitting, to the second UE, feedback information on the first set of feedback occasions and the second set of feedback occasions.

Some examples of the method, apparatuses, and non-transitory computer-readable medium described herein may further include operations, features, means, or instructions for receiving an indication of a bitmap identifying the duration scheduled for the uplink resources and the additional resources, in which transmitting the sidelink transmission using the uplink resources and during the duration may be based on the bitmap identifying the duration. Some examples of the method, apparatuses, and non-transitory computer-readable medium described herein may further include operations, features, means, or instructions for determining a resource pool including a first set of multiple durations indicated by a common slot format configuration and a second set of multiple durations including the duration indicated by a dedicated slot format configuration, in which the slot format configuration includes an indication of the dedicated slot format configuration and performing a resource reservation procedure based on the first set of multiple durations and the second set of multiple durations.

One innovative aspect of the subject matter described in this disclosure can be implemented in a method for wireless communication at a base station. The method includes transmitting, to a UE, a control signal indicating a set of durations, in which a duration of the set of durations is scheduled for uplink resources and additional resources, transmitting, to the UE, an indication of a slot format configuration permitting sidelink communications on the uplink resources during the duration scheduled for the uplink resources and the additional resources, and receiving, from the UE, feedback information based on transmitting a sidelink transmission using the uplink resources and during the duration.

Another innovative aspect of the subject matter described in this disclosure can be implemented in an apparatus for wireless communication at a base station. The apparatus may include a processor, memory coupled with the processor, and instructions stored in the memory. The instructions may be executable by the processor to cause the apparatus to transmit, to a UE, a control signal indicating a set of durations, in which a duration of the set of durations is scheduled for uplink resources and additional resources, transmit, to the UE, an indication of a slot format configuration permitting sidelink communications on the uplink resources during the duration scheduled for the uplink resources and the additional resources, and receive, from the UE, feedback information based on transmitting a sidelink transmission using the uplink resources and during the duration.

Another innovative aspect of the subject matter described in this disclosure can be implemented in an apparatus for wireless communication at a base station. The apparatus may include means for transmitting, to a UE, a control signal indicating a set of durations, in which a duration of the set of durations is scheduled for uplink resources and additional resources, means for transmitting, to the UE, an indication of a slot format configuration permitting sidelink communications on the uplink resources during the duration scheduled for the uplink resources and the additional resources, and means for receiving, from the UE, feedback information based on transmitting a sidelink transmission using the uplink resources and during the duration.

Another innovative aspect of the subject matter described in this disclosure can be implemented in a non-transitory computer-readable medium storing code for wireless communication at a base station. The code may include instructions executable by a processor to transmit, to a UE, a control signal indicating a set of durations, in which a duration of the set of durations is scheduled for uplink resources and additional resources, transmit, to the UE, an indication of a slot format configuration permitting sidelink communications on the uplink resources during the duration scheduled for the uplink resources and the additional resources, and receive, from the UE, feedback information based on transmitting a sidelink transmission using the uplink resources and during the duration.

In some examples of the method, apparatuses, and non-transitory computer-readable medium described herein, transmitting the indication of the slot format configuration may include operations, features, means, or instructions for transmitting, to a set of UEs, an indication of a common slot format configuration permitting the sidelink communications on a subset of the set of durations including the duration based on an uplink bandwidth scheduled for the subset of the set of durations satisfying a sidelink bandwidth threshold, in which the set of UEs includes the UE. Some examples of the method, apparatuses, and non-transitory computer-readable medium described herein may further include operations, features, means, or instructions for receiving, from the UE, an indication of a set of multiple sidelink identifiers associated with a set of UEs including the UE and a second UE, in which transmitting the indication of the slot format configuration may be based on the indication of the set of multiple sidelink identifiers.

DETAILED DESCRIPTION

Figure 1:
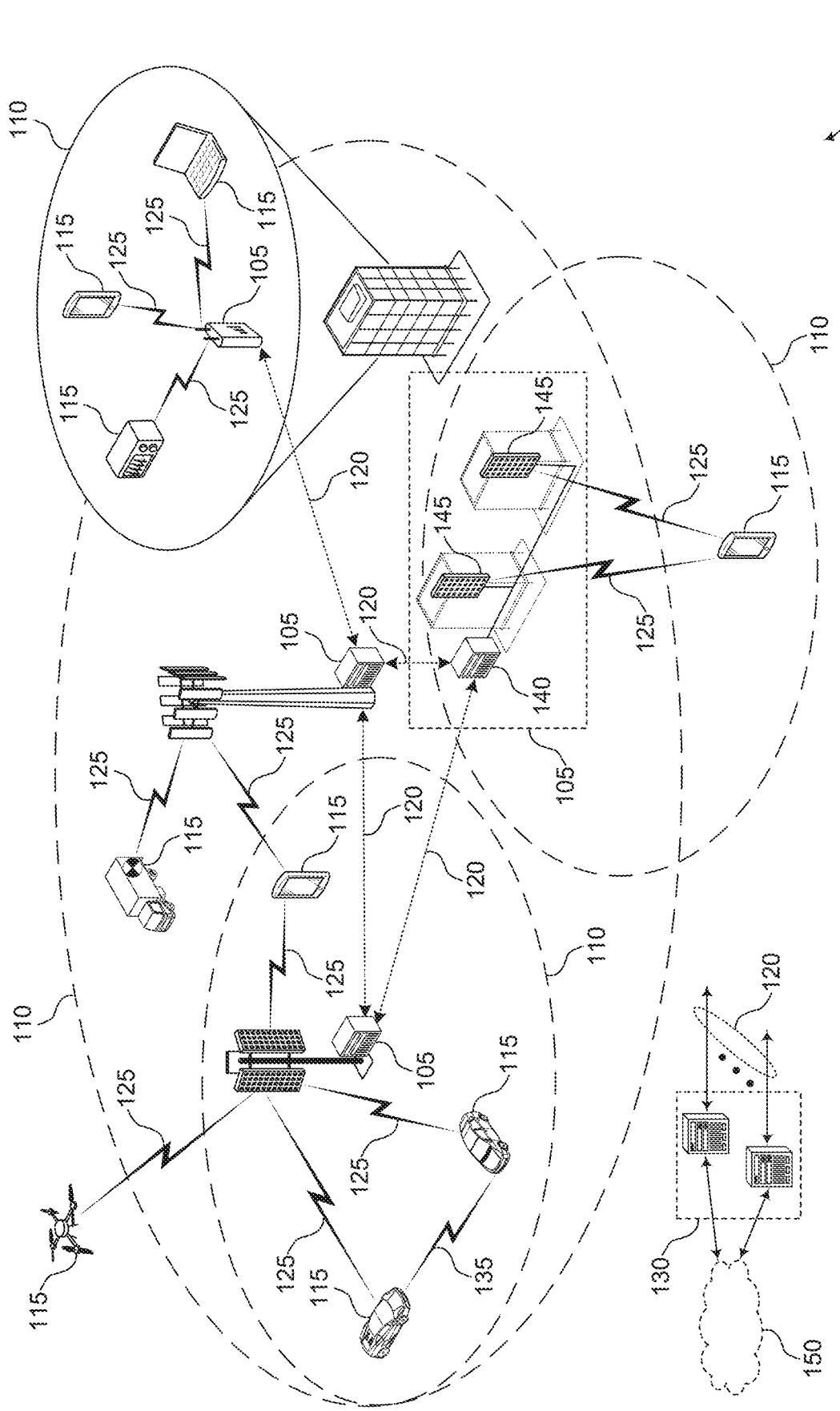
FIG. 1 illustrates an example of a wireless communications system that supports enhanced sidelink slot format configuration in accordance with aspects of the present disclosure.

A wireless communications system may support access links and sidelinks for communications between communication devices. An access link may refer to a communication link between a user equipment (UE) and a base station, and a sidelink may refer to a communication link between similar wireless devices (for example, a communication link between UEs, or a communication link between base stations). In some examples, sidelink communications may support multiple modes of resource allocation. In a first mode of resource allocation (for example, Mode 1), a base station may schedule resources for sidelink communications between multiple UEs. In a second mode of resource allocation (for example, Mode 2), a UE may autonomously schedule resources for sidelink communications, and a base station may not schedule resources for the sidelink communications. Additionally, some sidelink communications systems may support full-duplex communications (such as simultaneous data transmission and reception).

In wireless communications systems supporting access links and sidelinks, a UE may support various types of slots for communicating with other UEs or base stations. The various types of slots may include downlink slots, uplink slots, flexible slots, and special slots. In addition, the UE may be configured with various more complex slots, such as downlink+uplink slots, downlink+flexible slots, flexible+uplink slots, and flexible+downlink slots. For example, a downlink+uplink slot may include time and frequency resources allocated for downlink communications and time and frequency resources allocated for uplink communications. Similarly, a downlink+flexible slot may include time and frequency resources allocated for downlink communications and time and frequency resources allocated for downlink or uplink (such as flexible) communications. Additionally, a flexible+uplink slot may include time and frequency resources allocated for downlink or uplink (such as flexible) communications and time and frequency resources allocated for uplink communications. A flexible+downlink slot may include time and frequency resources allocated for downlink or uplink (such as flexible) communications and time and frequency resources allocated for downlink communications.

Various aspects of the present disclosure relate generally to sidelink resource allocation, and more specifically to allocating sidelink resources in uplink slots, downlink+uplink slots, and flexible+uplink slots. In particular, a UE may receive, from a base station, a control signal indicating a set of slots including one or more of uplink slots, downlink+uplink slots, and flexible+uplink slots. The UE may then receive an indication of a common slot format configuration, a dedicated slot format configuration, or both. The common slot format configuration and the dedicated slot format configuration may indicate that the UE is permitted to perform sidelink communications on uplink resources in one or more slots of the set of slots (such as uplink slots, downlink+uplink slots, and flexible+uplink slots). Additionally, the base station may transmit a slot format indicator (such as a dynamic control indicator in addition to the common slot format configuration and the dedicated slot format configuration) to dynamically permit the UE to perform sidelink communications on uplink resources of downlink+uplink slots or flexible+uplink slots, or both.

Particular aspects of the subject matter described in this disclosure may be implemented to realize one or more of the following potential advantages. The techniques employed by the described communication devices may implement flexible resource allocation for sidelink transmission. For example, operations performed by the described communication devices may provide improvements to a resource allocation for sidelink transmission by permitting sidelink communications on uplink resources scheduled for uplink slots, downlink+uplink slots, or flexible+uplink slots. Furthermore, UEs supporting full-duplex communications in sidelink communications systems may utilize the techniques described herein to simultaneously perform sidelink transmission with downlink reception thereby ensuring flexible communications in a group of UEs participating in sidelink communications. In some other implementations, operations performed by the described communication devices may also support reduced latency for sidelink communications, spectral efficiency, and higher data rates, among other benefits.

Aspects of the disclosure are initially described in the context of wireless communications systems. Aspects of the disclosure are further described in the context of a slot format, a resource reservation procedure, and resource allocation configurations. Aspects of the disclosure are further illustrated by and described with reference to apparatus diagrams, system diagrams, and flowcharts that relate to enhanced sidelink slot format configuration.

FIG. 1 illustrates an example of a wireless communications system 100 that supports enhanced sidelink slot format configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated with reference to FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown with reference to FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown with reference to FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of abase station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

According to one or more aspects, UEs 115 and base station 105 may participate in sidelink communications in transmission or reception resource pools. In some instances, the minimum resource allocation unit may be a sub-channel in frequency. In the frequency domain, a sidelink resource pool may include a number (numSubchannel) of contiguous sub-channels. A sub-channel may include a number (subchannelsize) of contiguous physical resource blocks, in which numSubchannel and subchannelsize may be higher layer parameters. Additionally, the base station 105 may perform a resource allocation procedure in time. The resource allocation in time may be denoted as one slot. In some examples, slots may not be available for sidelink transmission or reception. Additionally or alternatively, some slots may include feedback resources. In some examples, the base station 105 may indicate the resource allocation using an RRC configuration. The RRC configuration can be a pre-configuration (for example, preloaded on the UE 115) or a configuration received from the base station. In some examples, the sidelink resource pool may be configured using the RRC configuration. A minimum size for a sub-channel may be 10 contiguous resource blocks.

As depicted herein, a UE 115 may be (pre-)configured with a set of resource pools, in which each resource pool may be defined as a set of time-frequency resources. The minimum transmission or reception (for example, allocation) unit in time may be denoted as a sub-channel, in which each sub-channel is defined as a number of contiguous resource blocks. Each resource pool may further be (pre-)configured with one of the two resource allocation modes: Mode 1 and Mode 2. In Mode 1 operation, a base station may assign resources for sidelink transmission. In some examples, Mode 1 operation may support both dynamic allocation via a downlink control information format (for example, format 3-x) and configured transmissions (both Type-1 and Type-2). In Mode 2 operation, a UE 115 may perform a sensing procedure to identify the resources. Based on the outcome of sensing procedure (for example, based on identifying the priority of different transmissions and reference signal receive power), the UE 115 may select some resources for performing a sidelink transmission.

In some examples, the set of slots belonging to a sidelink resource pool may be denoted by $(t_0^{SL}, t_1^{SL}, \ldots t_{T_{max}-1}^{SL})$, in which $0 \leq t_i^{SL} < 10240 \times 2^\mu$, $0 \leq i < T_{max}$, the slot index is relative to slot number 0 of the radio frame corresponding to subframe number 0 of the serving cell. In some examples, the set may include all slots except the slots (for example, $N_{S\_SSB}$ slots) in which secondary synchronization signal or physical sidelink broadcast channel block is configured, and the slots (for example, $N_{nonSL}$ slots) in each of which at least one of Y-th, (Y+1)-th, . . . , (Y+X−1)-th OFDM symbols are not semi-statically configured as uplink based on a common slot format configuration (tdd-UL-DL-ConfigurationCommon) or sidelink time domain configuration (sl-TDD-Configuration), in which Y and X are set by the higher layer parameters sl-StartSymbol and sl-LengthSymbols, respectively. In some examples, the UE 115 may determine one or more reserved slots by determining the remaining slots excluding $N_{S\_SSB}$ slots and $N_{nonSL}$ slots from the set of all the slots and denoting the slots by $$\left( l_0, l_1, \ldots, l_{\left( 10240 \times 2^\mu - N_{S_{SSB}} - N_{nonSL} - 1 \right)} \right)$$

arranged in increasing order of slot index. The UE 115 may then identify that a slot $l_r$ ($0 \leq r < 10240 \times 2^\mu - N_{S_{SSB}} - N_{nonSL}$) belongs to the reserved slots if $$r = \left\lfloor \frac{m \cdot \left(10240 \times 2^\mu - N_{S_{SSB}} - N_{nonSL}\right)}{N_{reserved}} \right\rfloor,$$

here m=0, 1, . . . , $N_{reserved}-1$ and $N_{reserved}=(10240 \times 2^\mu - N_{S_{SSB}} - N_{nonSL})$ mod $L_{bitmap}$ in which $L_{bitmap}$ denotes the length of bitmap configured by higher layers. In some examples, the UE 115 may arrange slots in the set in increasing order of slot index. The UE 115 may determine the set of slots assigned to a sidelink resource pool as a bitmap $(b_0, b_1, \ldots, b_{L_{bitmap}-1})$ associated with the resource pool is used in which $L_{bitmap}$ the length of the bitmap is configured by higher layers and the UE 115 may determine that a slot $t_k^{SL}$ ($0 \leq k < 10240 \times 2^\mu - N_{S_{SSB}} - N_{nonSL} - N_{reserved}$) belongs to the set if $b_k=1$ in which k'=k mod $L_{bitmap}$. The slots in the set are re-indexed such that the subscripts i of the remaining slots $t'^{SL}_i$ are successive $\{0, 1, \ldots, T'_{max}-1\}$ in which $T'_{max}$ is the number of the slots remaining in the set.

In some examples, the UE 115 may use a sidelink information message (for example, SidelinkUEinformationNR message) for the indication of sidelink UE information to the network. From the sidelink information message information elements, the UE 115 may identify a sidelink transmission resource request list (for example, sl-TxResourceReqList), a sidelink transmission resource request (for example, SL-TxResourceReq) and a sidelink destination identify (for example, SL-DestinationIdentity). In some examples, the sidelink transmission resource request (for example, SL-TxResourceReq) may include parameters to request the transmission resources for sidelink communication to the network in a sidelink UE Information report.

As depicted herein, the UE 115 may be configured to exclude sidelink communication on $N_{nonSL}$ slots in each of which at least one of Y-th, (Y+1)-th, . . . , (Y+X−1)-th OFDM symbols are not semi-statically configured as uplink based on the common slot format configuration (tdd-UL-DL-ConfigurationCommon) or sidelink time domain configuration (sl-TDD-Configuration), in which Y and X are set by the higher layer parameters sl-StartSymbol and sl-LengthSymbols, respectively. In some wireless communications systems, sidelink communication may be permitted on slots which are semi-statically configured as uplink in the common slot format configuration (tdd-UL-DL-ConfigurationCommon). Aspects depicted herein may provide for one or more techniques to allocate sidelink resources in slots semi-statically configured as uplink or flexible. In particular, aspects depicted herein may provide for allocation of sidelink resources using a dedicated slot format configuration (tdd-UL-DL-ConfigurationDedicated) and a slot format indicator (dynamic indication). According to one or more aspects depicted herein, a UE 115 may receive, from a base station 105, a control signal indicating a set of slot, in which a slot of the set of slot is scheduled for uplink resources and additional resources. The additional resources may include downlink resources or flexible resources. The UE 115 may further receive, from the base station 105, an indication of a slot format configuration permitting sidelink communications on the uplink resources during the slot scheduled for the uplink resources and the additional resources. In some examples, the slot format configuration may include a common slot format configuration or a dedicated slot format configuration, or both. The UE 115 may then transmit, to a second UE 115 using the uplink resources and during the slot, a sidelink transmission based on the slot format configuration.

Figure 2:
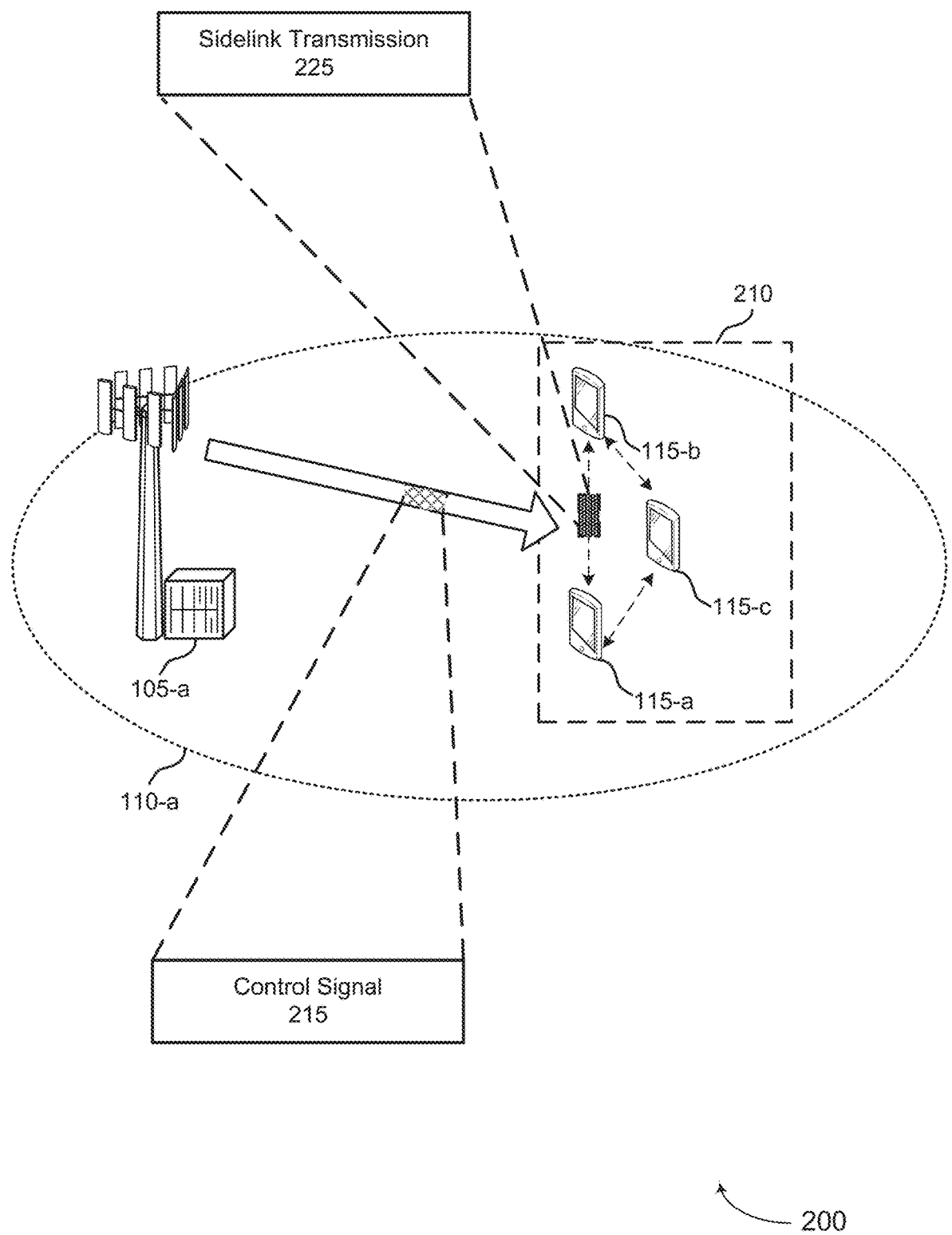
FIG. 2 illustrates an example of a wireless communications system that supports enhanced sidelink slot format configuration in accordance with aspects of the present disclosure.

FIG. 2 illustrates an example of a wireless communications system 200 that supports enhanced sidelink slot format configuration in accordance with aspects of the present disclosure. In some examples, the wireless communications system 200 may implement aspects of wireless communications system 100. The wireless communications system 200 includes a base station 105-*a*, a geographic coverage area 110-*a*, and one or more UEs 115 (may also be referred to as devices).

In some examples, the wireless communications system 200 may utilize control signaling to schedule resources for the UEs 115 to perform sidelink communications. Additionally or alternatively, the UEs 115 in the wireless communications system 200 may utilize shared information to enhance scheduling, inter-UE coordination, and communications flexibility. In some examples, the group of UEs 115 (for example, UE 115-*a* (UE 1), UE 115-*b* (UE 2), and UE 115-*c* (UE 3)) may communicate with each other (for example, within a V2X system, a D2D system, among other examples) and may employ sidelink transmissions to save power, reduce latency, and ensure reliable communications. In some examples, vehicles may communicate using V2X resource allocation mode 2 (that utilizes UE autonomous resource selection).

The wireless communications system 200 may support both access links and sidelinks for communications between one or more communication devices. An access link may refer to a communication link between a UE 115 (such as, UE 115-*a*, UE 115-*b* and UE 115-*c*) and a base station 105-*a*. A sidelink may refer to any communication link between similar wireless devices (for example, a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

The base station 105-a may communicate with one or more UEs 115 (for example, UEs 115-a, UE 115-b, and UE 115-c), which may be included within a UE group 210. For example, the base station 105-a may transmit a control signal 215 to the UE 115-a (UE 1), the UE 115-b (UE 2), or the UE 115-c (UE 3). As depicted in the example of FIG. 2, the UE 115-a, the UE 115-b, and the UE 115-c may communicate with each other (or with another group of UEs 115) over sidelink communications (for example, using a peer-to-peer (P2P) or D2D protocol). In some examples, the UE 115-a may transmit sidelink transmissions to the UE 115-b or the UE 115-c. In some examples, the UE 115-a or the UE 115-b may monitor resource pools for the sidelink communications or indications of the sidelink communications (for example, resource reservations, control channel transmissions, among other examples) from other UEs 115 in the group. Additionally or alternatively, the UEs 115 may have data to transmit to (or receive from) a UE 115 in the UE group 210 and may use the sidelink communications to transmit the data transmission. In some examples, the UE group 210 of the UEs 115 may utilize sidelinks communications in addition to access links with the base station 105-a.

As depicted herein, sidelink communications may support communications within a group of UEs 115 (for example, UE group 210). For instance, sidelink communications may include communications between a UE (such as, UE 115-a, UE 115-b, and UE 115-c) and other UEs 115 within a coverage area including the group of UEs (for example, a coverage area provided by a base station, a coverage area outside of the coverage area provided by the base station, or a combination thereof). A UE 115 in the group of UEs 115 may initiate sidelink communications with other UEs in the group of UEs. For example, the UEs 115 may be in a coverage area 110-a (for example, a coverage area 110 with reference to FIG. 1) of the base station 105-a. In such examples, a UE 115 may communicate with the base station 105-a via a Uu interface (for example, the base station 105-a may transmit downlink communications to the UE 115 via an access link). In some other examples, the group of UEs 115 may not be inside the coverage area or may not communicate with the base station 105-a using an access link.

In some examples, the UE 115 (such as, UE 115-a, UE 115-b, and UE 115-c) may have information (for example, a detection of an object or obstacle on a road in a V2X system, scheduling information, among other examples) to transmit to the group of UEs 115, and the UE 115 may initiate sidelink communications including the information to the other UEs 115. In such cases, the UE 115 initiating the sidelink communications may be referred to as a transmitting UE and the UE 115 receiving the sidelink communications may be referred to as a receiving UE. In some examples, the base station 105-a may configure sidelink communication resources for the group of UEs using a configuration message (for example, semi-persistent scheduling configuration message). In some examples, the base station 105-a may communicate the control signal 215 indicating a resource allocation for the UEs included in the group of UEs.

In some wireless communications systems, a UE 115 from the group of UEs may be allowed to select sidelink transmission resources. In some examples, the wireless communications system 200 may support two modes of resource allocation mechanism: Mode 1 (in which the resource is scheduled by a base station) and Mode 2 (in which the UE performs an autonomous resource selection). In the example of Mode 2 operation, each transmitting UE may perform a sensing operation to find occupied or available resources for transmission. For example, devices (receivers and transmitters) may perform a sensing operation before transmitting. In the example of Mode 2 operation, a transmitter device (for example, UE 115-a or UE 1) may schedule resources for receiver devices (for example, UE 115-b or UE 2). In particular, each transmitting UE (for example, UE 115-a or UE 1) may perform a sensing operation to find occupied or available resources for its own transmission.

Full-duplex refers to simultaneous data transmission and receptions over one channel. A full-duplex device may be capable of bi-directional network data transmissions at the same time while half-duplex devices may be capable of transmitting in one direction at one time. Some wireless communications systems may support full-duplex communications, in which some UEs 115 may support full-duplex communications while other UEs 115 may support half duplex communications. Full-duplex communication in sidelink may reduce blocking due to half-duplex constraint. For example, UEs 115 supporting full-duplex communications may eliminate the need for two blind transmissions when communicating with each other. Additionally or alternatively, full-duplex communications may support efficient UE-to-base station and UE-to-UE relaying, and simultaneous sidelink transmission and sensing in Mode 2 operation. Full-duplex in sidelink communication may also provide for enhanced inter-UE coordination. Full-duplex communication may include in-band full duplex communication and sub-band full duplex communication. During the in-band full duplex communication, the UE 115 may transmit and receive during the same time and frequency resource. During the in-band full duplex communication, the downlink and uplink may share common in-band full duplex communication time and frequency resources (having full or partial overlap). During the sub-band full duplex communication, the UE 115 may transmit and receive at the same time on different frequency resources (for example, the downlink resource may be separated from the uplink resource in the frequency domain).

In the wireless communications system 200, the base station 105-a may indicate a slot format using a slot format configuration (SlotFormatCombination). For example, the UE 115 may determine a slot format configuration based on a common slot format configuration (TDD-UL-DL-ConfigurationCommon) or a dedicated slot format configuration (TDD-UL-DL-ConfigDedicated) or both. The common slot format configuration (TDD-UL-DL-ConfigurationCommon) may define one or more patterns for slot formats (for example, pattern 1 alone or pattern 1 and pattern 2). In some examples, the base station 105-a may use the dedicated slot format configuration (TDD-UL-DL-ConfigDedicated) to configure a part of flexible slots or symbols or all flexible slots or symbols. By configuring the UE 115 with a slot format configuration (SlotFormatCombination), the UE 115 monitors a control signal (for example, DCI format 2_0) for a slot format indicator. In particular, the base station 105-a may utilize the common slot format configuration and the dedicated slot format configuration to indicate a configuration for a pattern of time slots (for example, uplink allocation, downlink allocation, flexible allocation) for resource allocation for the UE 115.

A base station 105-a may indicate for the UE 115 to perform sidelink communication on uplink semi-static symbols. The base station 105 may pre-configure or otherwise configure the UE 115 with a set of resource pools using the common slot format configuration (TDD-UL-DL-ConfigurationCommon) and the dedicated slot format configuration (TDD-UL-DL-ConfigDedicated). In some examples, the base station 105-a may further pre-configure or otherwise configure each resource pool with one of the two resource allocation modes (for example, Mode 1 resource allocation or Mode 2 resource allocation). In some examples, the base station 105-a may define a slot format as a downlink slot and an uplink slot. In addition to downlink, uplink, flexible, and special slots, the base station 105-a may be configured with downlink+uplink slots, downlink+flexible slots, flexible+uplink slots, and flexible+downlink slots. The downlink+uplink slot may be used for both downlink and uplink transmissions. The downlink and uplink transmissions may occur in overlapping frequency bands (in-band full-duplex) or adjacent frequency bands (sub-band full-duplex). In a given downlink+uplink symbol, a UE 115 supporting half-duplex communication may either transmit in the uplink resource or receive in the downlink resource. In a downlink+uplink symbol, a UE 115 supporting full-duplex communication may transmit in the uplink resource or receive in the downlink resource in the same slot. The downlink+uplink slot may include downlink only symbols, uplink only symbols or full-duplex symbol. Additionally or alternatively, the wireless communications system 200 may support downlink+flexible slot format and flexible+uplink slot format.

Aspects of the present disclosure provide for defining sidelink resources in time slots. In some examples, the base station 105-a may transmit the control signal 215 indicating a set of durations (for example, time slot). In some examples, a duration of the set of durations may be scheduled for uplink resources and additional resources. The additional resources may include downlink resources or flexible resources. The base station 105-a may transmit an indication of a slot format configuration permitting sidelink communications on the uplink resources during the duration scheduled for the uplink resources and the additional resources. For example, the UE 115-a may receive the indication of the slot format configuration from the base station 105-a. The base station 105-a may transmit a common slot format configuration (tdd-UL-DL-ConfigurationCommon) or a dedicated slot format configuration (tdd-UL-DL-ConfigurationDedicated), or both to indicate to a UE group 210 additional sidelink slots or sub-channels. The UE 115-a may transmit a sidelink 225 transmission to a second UE 115-b using the uplink resources and during the duration. In particular, aspects of the present disclosure is directed to defining sidelink resources in slots semi-statically indicated as uplink or flexible in a dedicated slot format configuration (tdd-UL-DL-ConfigurationDedicated) and dynamically indicated as uplink by a slot form indicator. In addition, aspects depicted herein is directed to defining sidelink resources in downlink+uplink slots, downlink+flexible slots, flexible+uplink slots, and uplink slots.

Figure 3:
FIG. 3 illustrates an example of a slot format that supports enhanced sidelink slot format configuration in accordance with aspects of the present disclosure.
Figure 3:
Figure 3:
Figure 3:
Figure 3:
Figure 3:

FIG. 3 illustrates an example of a slot format 300 that supports enhanced sidelink slot format configuration in accordance with aspects of the present disclosure. In some examples, the slot format 300 may implement aspects of wireless communications systems 100 or 200. For example, the slot format 300 may be implemented by a UE 115, a base station 105, or both to improve resource allocation for sidelink communications. In some examples, the UE 115 may identify a slot format configuration for resource allocation for sidelink communication. For instance, the UE 115 may receive an indication of a slot format configuration permitting sidelink communications on the uplink resources during a duration scheduled for the uplink resources and the additional resources. As illustrated with reference to FIG. 3, the base station 105 may transmit the slot format configuration in a common slot format configuration, in a dedicated slot format configuration, or a both.

In some examples, the base station 105 may transmit the common slot format configuration (for example, as a set of TDD-DL-UL-ConfigurationCommon parameters) or the dedicated slot format configuration (for example, as a set of TDD-DL-UL-ConfigurationDedicated parameters), or both, to the UE 115 via RRC signaling, or a MAC-CE, among other examples. The common slot format configuration may include a pattern of uplink slots 325, downlink+uplink slots 330, downlink slots 335, flexible slots 340, or flexible+uplink slots 345. According to one or more aspects, the base station 105 may define slots formats in which sidelink is permitted. In some examples, the base station 105 may indicate that sidelink communication is permitted in the uplink resources of the uplink slots 325, the downlink+uplink slots 330, and the flexible+uplink slots 345 as defined in the common slot format configuration (for example, as a set of TDD-DL-UL-ConfigurationCommon parameters) or the dedicated slot format configuration (for example, as a set of TDD-DL-UL-ConfigurationDedicated parameters), or both. In some examples, the base station 105 may transmit an indication of a common slot format configuration permitting the sidelink communications on a set of slots based on an uplink bandwidth scheduled for the set of slots satisfying a sidelink bandwidth threshold (for example, 10 MHz). In some examples, the base station 105 may refrain from including a slot defined as non-sidelink in the set of slots.

According to one or more aspects, the base station 105 may utilize the dedicated slot format configuration (for example, as a set of TDD-DL-UL-ConfigurationDedicated parameters) to configure a group of UEs 115 with additional sidelink slots or sub-channels. A UE 115 in the group of UEs may communicate with each other using the configured sidelink sub-channels. The UE 115 may transmit an indication of a set of sidelink identifiers (defined as sl-TxResourceReq) associated with the group of UEs 115. For example, identity of UEs in a groupcast or unicast session may be available to the base station 105. In some examples, the base station 105 may define a resource pool including sidelink slots from both the common slot format configuration and the dedicated slot format configuration. The UE 115 may receive an indication of the common slot format configuration for a first set of feedback occasions and an indication of the dedicated slot format configuration for a second set of feedback occasions. The UE 115 may transmit feedback information to a second UE 115 on the first set of feedback occasions and the second set of feedback occasions. For example, physical sidelink feedback channel resources may be self-contained to slots configured by the common slot format configuration or the dedicated slot format configuration, or both.

In some examples, the UE 115 may receive an indication of a bitmap identifying the slot scheduled for the uplink resources or the uplink resources and the additional resources (for example, uplink resources of the uplink slots 325, the downlink+uplink slots 330, and the flexible+uplink slots 345). For instance, the base station 105 may utilize the bitmap (for example, b dedicated) to identify the slots in which sidelink transmission is permitted. In some examples, the base station 105 may define sidelink slots on uplink resources indicated by a slot format indicator. For example, the slot format indicator may indicate whether sidelink communication is permitted in slots including uplink resources. The UE 115 may determine resource reservations on a set of dynamic resources based on a number of slots indicated by the slot format indicator. The UE 115 may then transmit the sidelink transmission during the slot is based on the resource reservations. In some examples, a symbol type may indicate whether the symbol is for uplink communication only or uplink communication or sidelink communication (for example, in the uplink slots 325, the downlink+ uplink slots 330, and the flexible+uplink slots 345).

In some examples, the techniques depicted with reference to FIG. 3 may enable dynamic resource allocation based on sidelink scheduling requests. For a groupcast or unicast cast connection, UEs 115 in same group may be configured with same resources. In the Mode 1 operation, the base station 105 may transmit a scheduling downlink control information to a transmitter UE (for example, a UE 115 transmitting a sidelink transmission) and a slot format indicator to both transmitter and receiver UEs 115. The slot format indicator may indicate a location of sidelink transmission to the receiver UE 115. In some examples, the UE 115 may receive a scheduling downlink control information and a slot format indicator permitting the sidelink communications during the slot scheduled for the uplink resources and the additional resources (for example, sidelink transmission is permitted during the uplink resources of the uplink slots 325, the downlink+uplink slots 330, and the flexible+uplink slots 345). In some examples, the physical sidelink feedback channel resources for dynamic sidelink may be self-contained to dynamic sidelink feedback occasions (for example, sidelink feedback occasions configured using dynamic scheduling). In Mode 2 operation, resource reservations on dynamic resources may be limited to a number of slots indicated by the slot format indicator.

According to one or more aspects depicted herein, the UE 115 may utilize one or more prioritization rules to resolve scheduling conflicts between uplink communication and sidelink communication. In some examples, the base station 105 may reserve flexible resources (symbols or resource blocks) for UEs 115 to communicate with the base station 105. In Mode 1 operation, such resource reservation may be implicitly indicated from scheduling (for example, the base station 105 avoids scheduling any sidelink transmission in uplink only slots). In Mode 1 operation, the base station 105 may indicate a resource pool with a hybrid resource allocation and a separate indication for sidelink availability. In some examples, the base station 105 may activate or deactivate sidelink resources in flexible resources (for example, flexible resources of the flexible+uplink slots 345). In some examples, the base station 105 may configure a bitmap to indicate uplink only resources and resources in which sidelink transmission is permitted. A length of the bitmap may be a length of a frame, (for example, 20 bits or 20 slots for 30 kHz subcarrier spacing).

Figure 4:
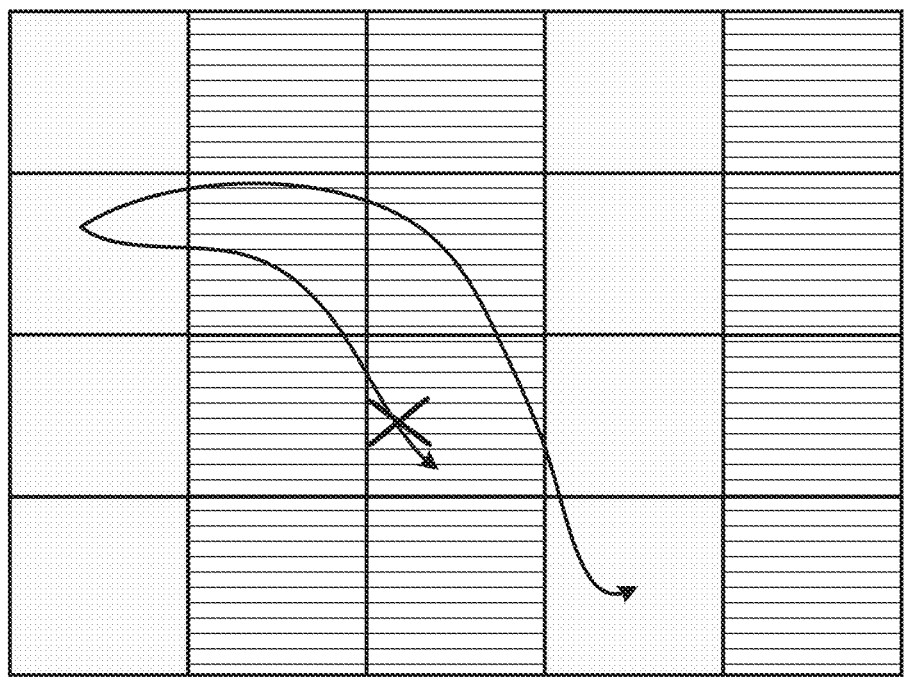
FIG. 4 illustrates an example of a resource reservation procedure that supports enhanced sidelink slot format configuration in accordance with aspects of the present disclosure.

FIG. 4 illustrates an example of a resource reservation procedure 400 that supports enhanced sidelink slot format configuration in accordance with aspects of the present disclosure. In some examples, the resource reservation procedure 400 may implement aspects of wireless communications systems 100 or 200. For example, the resource reservation procedure 400 may be implemented by a UE 115 to improve resource allocation for sidelink communications.

In some examples, the UE 115 may identify a resource pool for sidelink communication. For instance, the UE 115 may receive an indication of a slot format configuration permitting sidelink communications on the uplink resources during a slot scheduled for the uplink resources and the downlink resources or flexible resources. In some examples, a base station 105 may perform resource allocation in units of sub-channels in the frequency domain and the resource allocation may be limited to one slot in the time domain. A transmission may reserve resources in a current slot and in up to two future slots. In such examples, the base station 105 may indicate the reservation information in sidelink control information. Additionally or alternatively, reservations may be in a window of 32 logical slots. In some examples, the sidelink control information may signal a period, with configurable values (for example, between 0ms and 1000 ms). Periodic resource reservation and signaling may also be disabled by (pre-)configuration.

In some wireless communications systems, a total number of slots in resource pool may be fixed, in which some slots may be tagged as unusable for UEs 115 if not configured as uplink in their dedicated slot format configuration. In Mode 2 operation, the UE 115 may identify one resource pool that includes sidelink slots from the common slot format configuration (TDD-UL-DL-ConfigurationCommon) or the dedicated slot format configuration (TDD-UL-DL-ConfigDedicated), or both. The UE 115 may determine a resource pool including a first set of slots indicated by a common slot format configuration and a second set of slots indicated by a dedicated slot format configuration. As depicted in the example of FIG. 4, the UE 115 may identify the first set of slots 405 indicated by the common slot format configuration and the second set of slots 410 indicated by the dedicated slot format configuration. In some examples, the resource reservation behavior may be dependent on a connection type (for example, groupcast or unicast) or a slot type, or both. In some examples, the UE 115 may refrain, during the second set of slots 410, from reserving resources scheduled during at least one slot of the first set of slots 405. For instance, the base station 105 may indicate that resource reservation from dedicated sidelink slots (for example, slots indicated using the dedicated slot format configuration) to common sidelink slots (for example, slots indicated using the common slot format configuration) slots is not permitted. By refraining from reserving resources from dedicated sidelink slots to common sidelink slots, the UE 115 may avoid collisions (as a UE without a dedicated slot format configuration may not be able to decode the reservations on the dedicated sidelink slots).

Figure 5A:
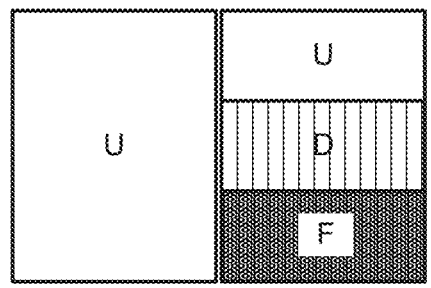
FIGS. 5A and 5B illustrate examples of resource allocation configurations that support enhanced sidelink slot format configuration in accordance with aspects of the present disclosure.
Figure 5B:
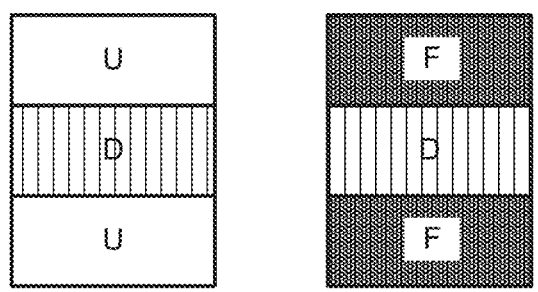

FIGS. 5A and 5B illustrate examples of a resource allocation configuration 500 and a resource allocation configuration 550 that support enhanced sidelink slot format configuration in accordance with aspects of the present disclosure. The resource allocation configuration 500 and the resource allocation configuration 550 may implement aspects of wireless communications systems 100 or 200.

According to one or more aspects, the UE 115 may determine a resource pool including a set of slots (for example, durations) associated with a sub-channel. All sub-channels in flexible resources may be defined as a separate resource pool. For instance, a resource pool may either defined on a first type of sidelink slots or a second type of sidelink slots including flexible F slots. In some examples, a base station 105 may configure a resource pool to include non-contiguous sub-channels in sub-band full duplex slots.

As depicted in the example of FIG. 5A, the base station 105 configures a resource pool according to the resource allocation configuration 500 to include non-contiguous sub-channels. In some examples, the base station 105 may configure more than one resource pool, in which each resource pool includes a number of contiguous sidelink sub-channels. As depicted in the example of FIG. 5B, the base station 105 may configure a first resource pool for uplink resources and a second resource pool for flexible resources. In such examples, the uplink and flexible resources in each resource pool may not be contiguous. The base station 105 may configure the flexible resources in a separate resource pool as flexible resources may be associated with a hybrid resource allocation (for example, hybrid between Mode 1 operation and Mode 2 operation).

Figure 6:
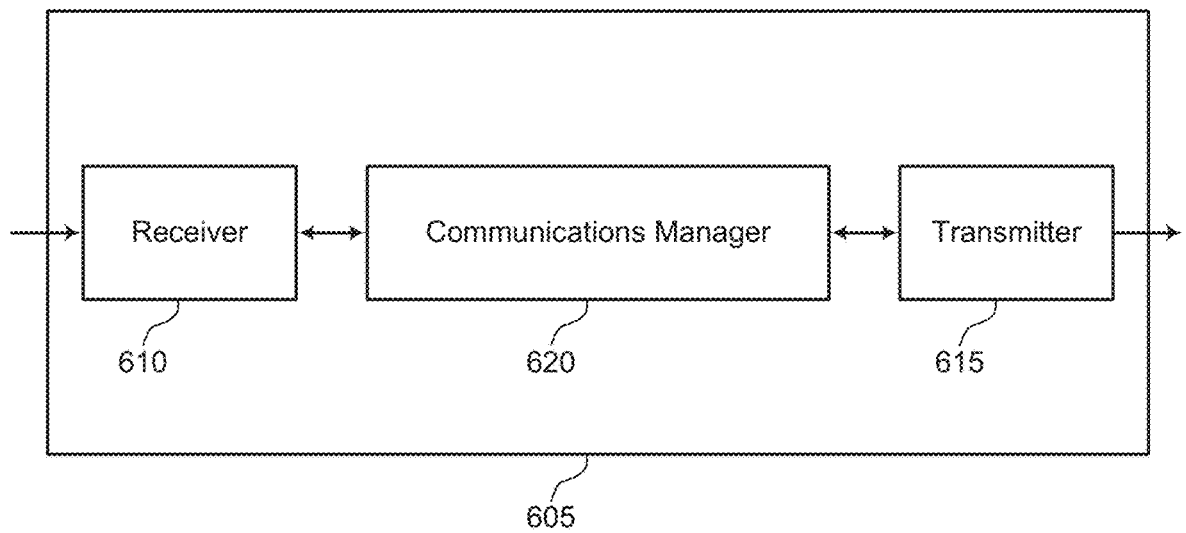
FIGS. 6 and 7 show block diagrams of devices that support enhanced sidelink slot format configuration in accordance with aspects of the present disclosure.

FIG. 6 shows a block diagram of a device 605 that supports enhanced sidelink slot format configuration in accordance with aspects of the present disclosure. The device 605 may be an example of aspects of a UE 115. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to enhanced sidelink slot format configuration). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to enhanced sidelink slot format configuration). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of enhanced sidelink slot format configuration. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

In some examples, the communications manager 620 may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations.

The communications manager 620 may support wireless communication at a first UE in accordance with examples as disclosed herein. For example, the communications manager 620 may be configured as or otherwise support a means for receiving, from a base station, a control signal indicating a set of durations, in which a duration of the set of durations is scheduled for uplink resources and additional resources. The communications manager 620 may be configured as or otherwise support a means for receiving, from the base station, an indication of a slot format configuration permitting sidelink communications on the uplink resources during the duration scheduled for the uplink resources and the additional resources. The communications manager 620 may be configured as or otherwise support a means for transmitting, to a second UE using the uplink resources and during the duration, a sidelink transmission based on the slot format configuration.

By including or configuring the communications manager 620 in accordance with examples, the device 605 (for example, a processor controlling or otherwise coupled to the receiver 610, the transmitter 615, the communications manager 620, or a combination thereof) may support techniques for reduced processing, reduced power consumption, and more efficient utilization of communication resources.

Figure 7:
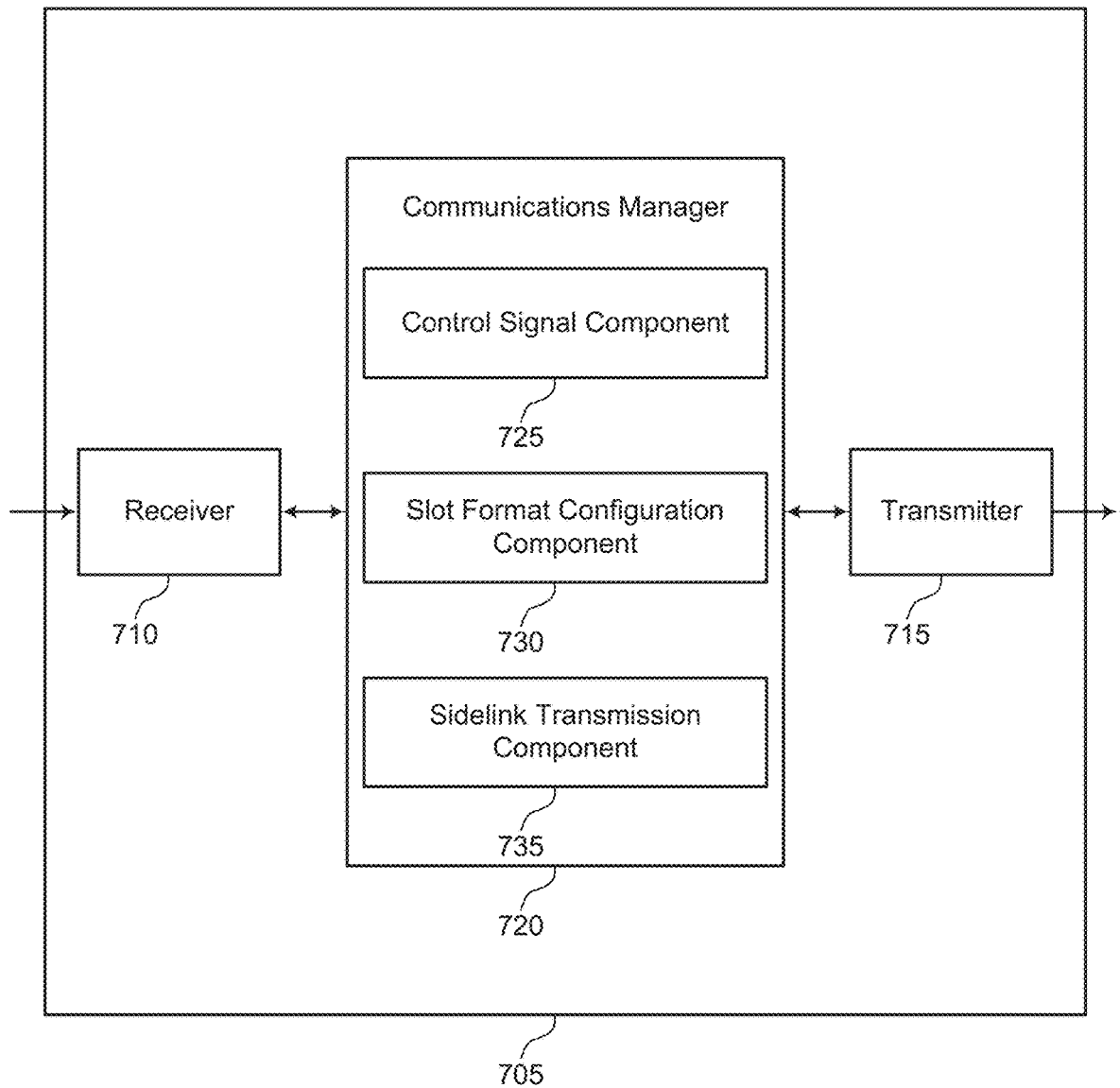

FIG. 7 shows a block diagram of a device 705 that supports enhanced sidelink slot format configuration in accordance with aspects of the present disclosure. The device 705 may be an example of aspects of a device 605 or a UE 115. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to enhanced sidelink slot format configuration). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to enhanced sidelink slot format configuration). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of enhanced sidelink slot format configuration. For example, the communications manager 720 may include a control signal component 725, a slot format configuration component 730, a sidelink transmission component 735, or any combination thereof. In some examples, the communications manager 720, or various components thereof, may be configured to perform various operations (for example, receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations.

The communications manager 720 may support wireless communication at a first UE in accordance with examples as disclosed herein. The control signal component 725 may be configured as or otherwise support a means for receiving, from a base station, a control signal indicating a set of durations, in which a duration of the set of durations is scheduled for uplink resources and additional resources. The slot format configuration component 730 may be configured as or otherwise support a means for receiving, from the base station, an indication of a slot format configuration permitting sidelink communications on the uplink resources during the duration scheduled for the uplink resources and the additional resources. The sidelink transmission component 735 may be configured as or otherwise support a means for transmitting, to a second UE using the uplink resources and during the duration, a sidelink transmission based on the slot format configuration.

Figure 8:
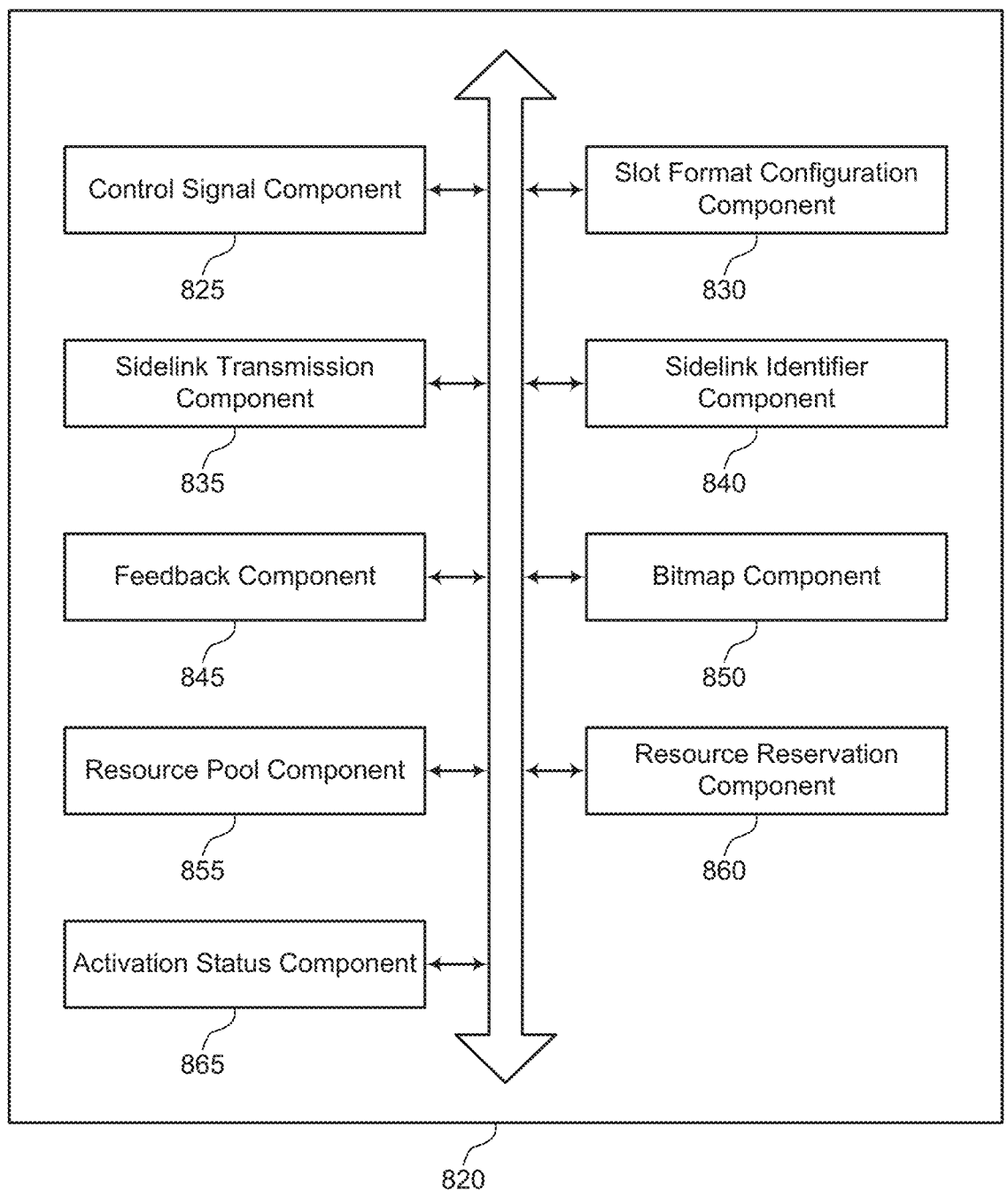
FIG. 8 shows a block diagram of a communications manager that supports enhanced sidelink slot format configuration in accordance with aspects of the present disclosure.

FIG. 8 shows a block diagram of a communications manager 820 that supports enhanced sidelink slot format configuration in accordance with aspects of the present disclosure. The communications manager 820, or various components thereof, may be an example of means for performing various aspects of enhanced sidelink slot format configuration. For example, the communications manager 820 may include a control signal component 825, a slot format configuration component 830, a sidelink transmission component 835, a sidelink identifier component 840, a feedback component 845, a bitmap component 850, a resource pool component 855, a resource reservation component 860, an activation status component 865, or any combination thereof. Each of these components may communicate, directly or indirectly, with one another (for example, via one or more buses).

The communications manager 820 may support wireless communication at a first UE in accordance with examples as disclosed herein. The control signal component 825 may be configured as or otherwise support a means for receiving, from a base station, a control signal indicating a set of durations, in which a duration of the set of durations is scheduled for uplink resources and additional resources. The slot format configuration component 830 may be configured as or otherwise support a means for receiving, from the base station, an indication of a slot format configuration permitting sidelink communications on the uplink resources during the duration scheduled for the uplink resources and the additional resources. The sidelink transmission component 835 may be configured as or otherwise support a means for transmitting, to a second UE using the uplink resources and during the duration, a sidelink transmission based on the slot format configuration.

In some examples, to support receiving the indication of the slot format configuration, the slot format configuration component 830 may be configured as or otherwise support a means for receiving, from the base station, an indication of a common slot format configuration permitting the sidelink communications on a subset of the set of durations including the duration based on an uplink bandwidth scheduled for the subset of the set of durations satisfying a sidelink bandwidth threshold.

In some examples, the sidelink identifier component 840 may be configured as or otherwise support a means for transmitting, to the base station, an indication of a set of multiple sidelink identifiers associated with a set of UEs including the first UE and the second UE, in which receiving the indication of the slot format configuration is based on the indication of the set of multiple sidelink identifiers.

In some examples, to support receiving the indication of the slot format configuration, the slot format configuration component 830 may be configured as or otherwise support a means for receiving, from the base station, an indication of a common slot format configuration for a first set of feedback occasions and an indication of a dedicated slot format configuration for a second set of feedback occasions. In some examples, the feedback component 845 may be configured as or otherwise support a means for transmitting, to the second UE, feedback information on the first set of feedback occasions and the second set of feedback occasions.

In some examples, the bitmap component 850 may be configured as or otherwise support a means for receiving an indication of a bitmap identifying the duration scheduled for the uplink resources and the additional resources, in which transmitting the sidelink transmission using the uplink resources and during the duration is based on the bitmap identifying the duration.

In some examples, the resource pool component 855 may be configured as or otherwise support a means for determining a resource pool including a first set of multiple durations indicated by a common slot format configuration and a second set of multiple durations including the duration indicated by a dedicated slot format configuration, in which the slot format configuration includes an indication of the dedicated slot format configuration. In some examples, the resource reservation component 860 may be configured as or otherwise support a means for performing a resource reservation procedure based on the first set of multiple durations and the second set of multiple durations.

In some examples, the resource reservation procedure is based on a connection type or a duration type, or both. In some examples, the resource reservation component 860 may be configured as or otherwise support a means for refraining, during the second set of multiple durations, from reserving resources scheduled during at least one duration of the first set of multiple durations. In some examples, a total number of durations in the resource pool is fixed. In some examples, the additional resources include downlink resources or flexible resources.

In some examples, the resource reservation component 860 may be configured as or otherwise support a means for determining resource reservations scheduled for a number of durations indicated by the slot format indicator, in which transmitting the sidelink transmission during the duration is based on the resource reservations.

In some examples, the slot format configuration component 830 may be configured as or otherwise support a means for receiving, from the base station, a scheduling downlink control information and a slot format indicator permitting the sidelink communications during the duration scheduled for the uplink resources and the additional resources, in which transmitting the sidelink transmission during the duration is based on the slot format indicator.

In some examples, the activation status component 865 may be configured as or otherwise support a means for receiving, from the base station, an indication to change an activation status of the additional resources, in which transmitting the sidelink transmission is based on receiving the indication to change the activation status of sidelink resources.

In some examples, the resource pool component 855 may be configured as or otherwise support a means for determining a resource pool for the duration associated with a sub-channel, in which transmitting the sidelink transmission during the duration is based on the resource pool, the duration being scheduled for the uplink resources and the additional resources including flexible resources. In some examples, the resource pool includes non-contiguous sub-channels in the set of durations.

In some examples, the resource pool component 855 may be configured as or otherwise support a means for determining a second resource pool including a second set of durations, in which the resource pool and the second resource pool each includes a number of contiguous sidelink sub-channels. In some examples, the resource pool is associated with the uplink resources and a second resource pool is associated with the additional resources including flexible resources, the resource pool being non-contiguous with the second resource pool.

Figure 9:
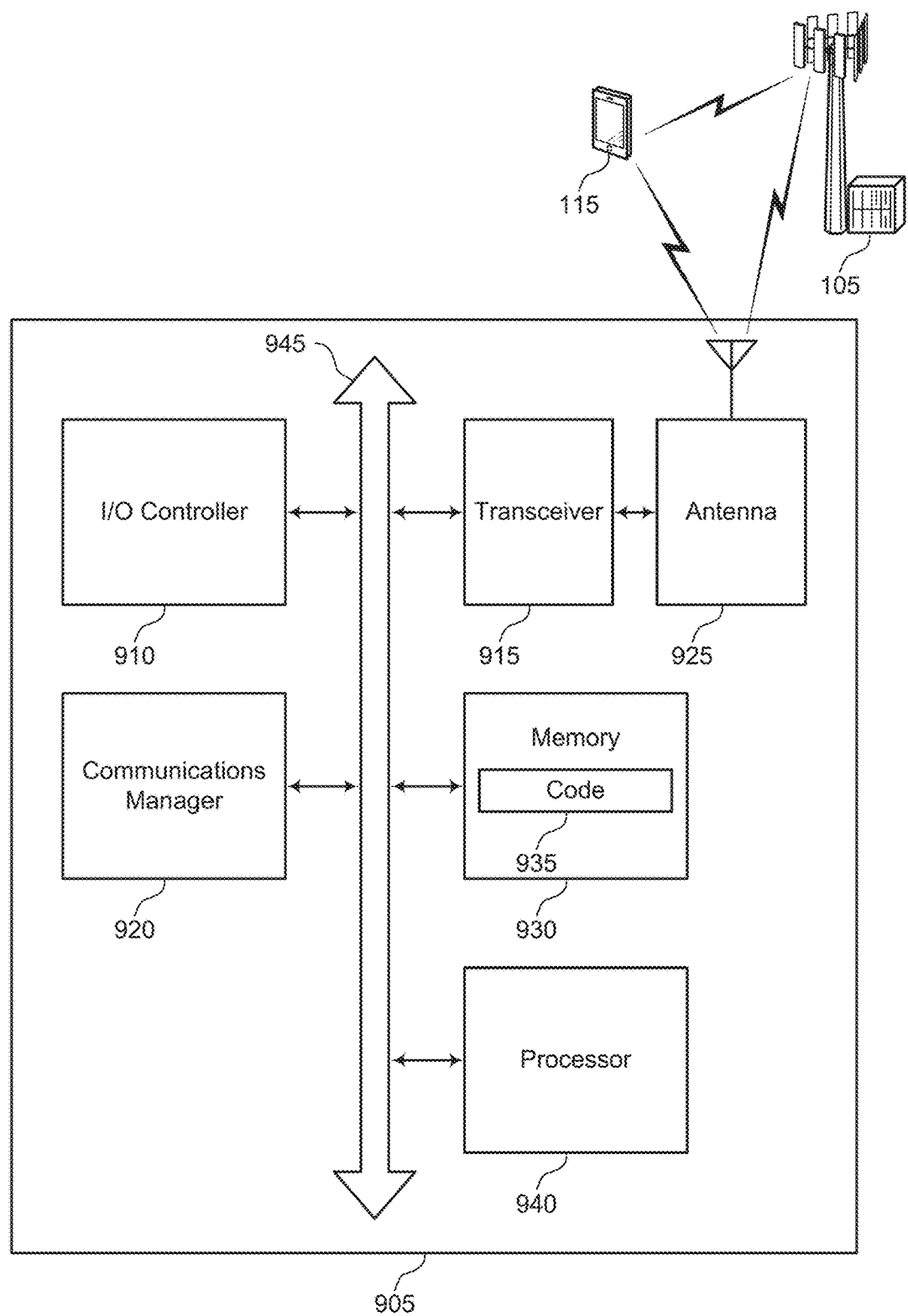
FIG. 9 shows a diagram of a system including a device that supports enhanced sidelink slot format configuration in accordance with aspects of the present disclosure.

FIG. 9 shows a diagram of a system including a device 905 that supports enhanced sidelink slot format configuration in accordance with aspects of the present disclosure. The device 905 may be an example of or include the components of a device 605, a device 705, or a UE 115. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some examples, the I/O controller 910 may represent a physical connection or port to an external peripheral. In some examples, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some examples, the I/O controller 910 may be implemented as part of a processor, such as the processor 940. In some examples, a user may interact with the device 905 via the I/O controller 910 or via hardware components controlled by the I/O controller 910.

In some examples, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some examples, the code 935 may not be directly executable by the processor 940 but may cause a computer (for example, when compiled and executed) to perform functions described herein. In some examples, the memory 930 may contain, among other things, a basic I/O system (BIOS) which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting enhanced sidelink slot format configuration). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving, from a base station, a control signal indicating a set of durations, in which a duration of the set of durations is scheduled for uplink resources and additional resources. The communications manager 920 may be configured as or otherwise support a means for receiving, from the base station, an indication of a slot format configuration permitting sidelink communications on the uplink resources during the duration scheduled for the uplink resources and the additional resources. The communications manager 920 may be configured as or otherwise support a means for transmitting, to a second UE using the uplink resources and during the duration, a sidelink transmission based on the slot format configuration.

By including or configuring the communications manager 920 in accordance with examples, the device 905 may support techniques for improved communication reliability, reduced latency, improved user experience related to reduced processing, reduced power consumption, and improved coordination between devices.

In some examples, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of enhanced sidelink slot format configuration, or the processor 940 and the memory 930 may be otherwise configured to perform or support such operations.

Figure 10:
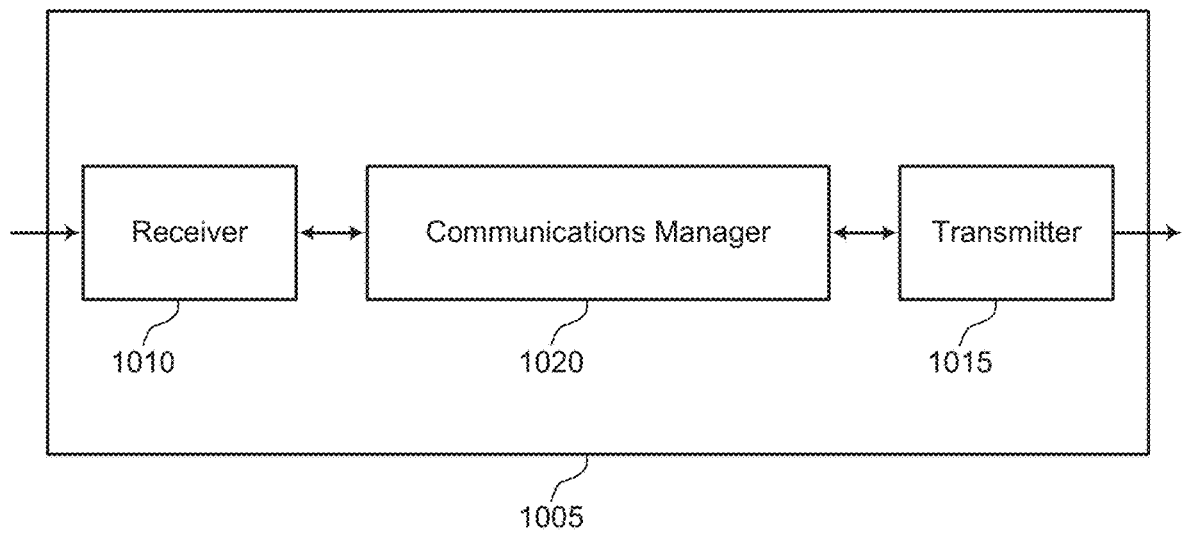
FIGS. 10 and 11 show block diagrams of devices that support enhanced sidelink slot format configuration in accordance with aspects of the present disclosure.

FIG. 10 shows a block diagram of a device 1005 that supports enhanced sidelink slot format configuration in accordance with aspects of the present disclosure. The device 1005 may be an example of aspects of a base station 105. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to enhanced sidelink slot format configuration). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to enhanced sidelink slot format configuration). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of enhanced sidelink slot format configuration. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

In some examples, the communications manager 1020 may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations.

The communications manager 1020 may support wireless communication at a base station in accordance with examples as disclosed herein. For example, the communications manager 1020 may be configured as or otherwise support a means for transmitting, to a UE, a control signal indicating a set of durations, in which a duration of the set of durations is scheduled for uplink resources and additional resources. The communications manager 1020 may be configured as or otherwise support a means for transmitting, to the UE, an indication of a slot format configuration permitting sidelink communications on the uplink resources during the duration scheduled for the uplink resources and the additional resources. The communications manager 1020 may be configured as or otherwise support a means for receiving, from the UE, feedback information based on transmitting a sidelink transmission using the uplink resources and during the duration.

By including or configuring the communications manager 1020 in accordance with examples, the device 1005 (for example, a processor controlling or otherwise coupled to the receiver 1010, the transmitter 1015, the communications manager 1020, or a combination thereof) may support techniques for reduced processing, reduced power consumption, and more efficient utilization of communication resources.

Figure 11:
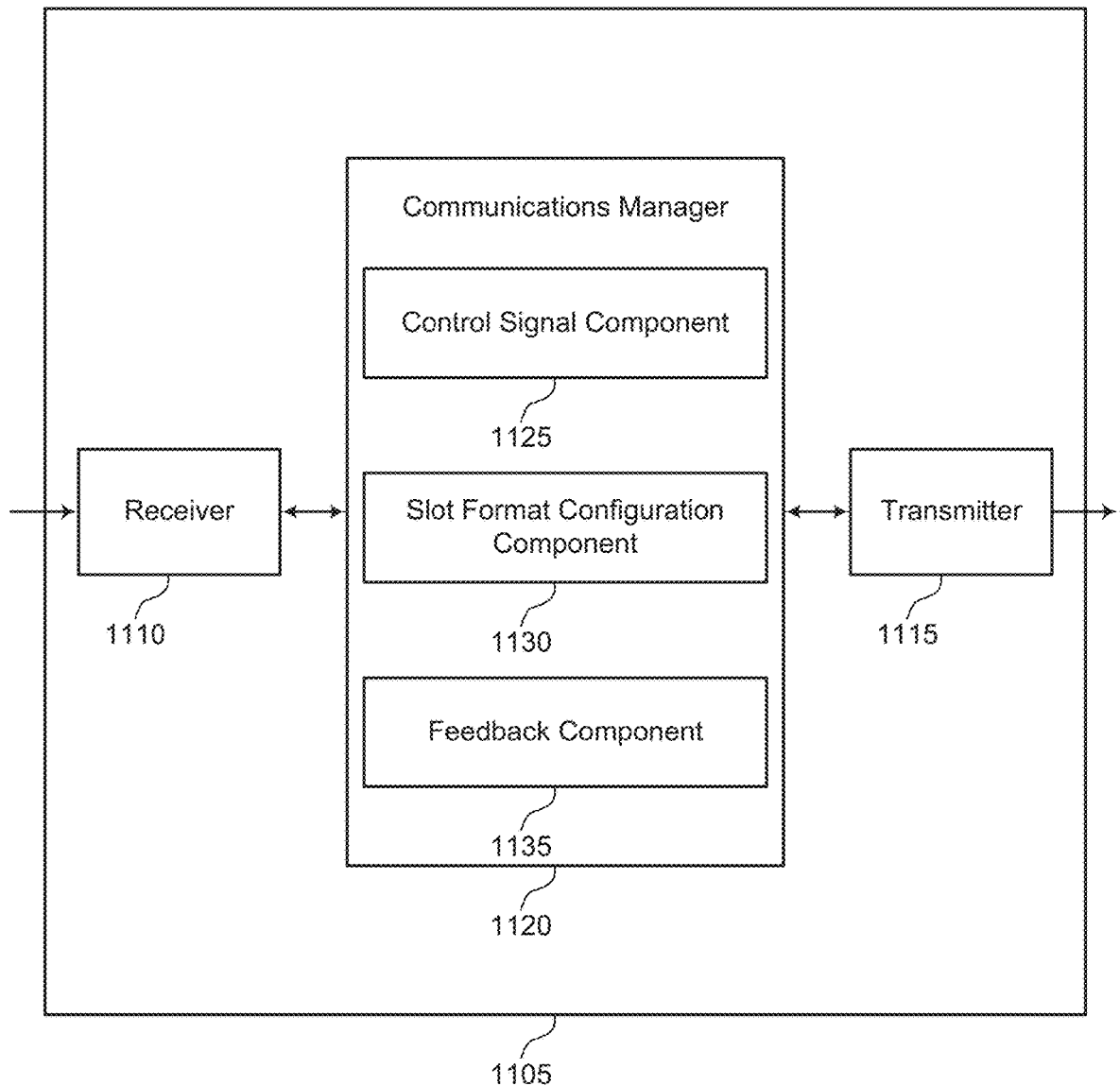

FIG. 11 shows a block diagram of a device 1105 that supports enhanced sidelink slot format configuration in accordance with aspects of the present disclosure. The device 1105 may be an example of aspects of a device 1005 or a base station 105. The device 1105 may include a receiver 1110, a transmitter 1115, and a communications manager 1120. The communications manager 1120 can be implemented, at least in part, by one or both of a modem and a processor. Each of these components may be in communication with one another (for example, via one or more buses).

The receiver 1110 may provide a means for receiving information such as packets, user data, control information, or any combination thereof associated with various information channels (for example, control channels, data channels, information channels related to enhanced sidelink slot format configuration). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (for example, control channels, data channels, information channels related to enhanced sidelink slot format configuration). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of enhanced sidelink slot format configuration. For example, the communications manager 1120 may include a control signal component 1125, a slot format configuration component 1130, a feedback component 1135, or any combination thereof. In some examples, the communications manager 1120, or various components thereof, may be configured to perform various operations (for example, receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations.

The communications manager 1120 may support wireless communication at a base station in accordance with examples as disclosed herein. The control signal component 1125 may be configured as or otherwise support a means for transmitting, to a UE, a control signal indicating a set of durations, in which a duration of the set of durations is scheduled for uplink resources and additional resources. The slot format configuration component 1130 may be configured as or otherwise support a means for transmitting, to the UE, an indication of a slot format configuration permitting sidelink communications on the uplink resources during the duration scheduled for the uplink resources and the additional resources. The feedback component 1135 may be configured as or otherwise support a means for receiving, from the UE, feedback information based on transmitting a sidelink transmission using the uplink resources and during the duration.

Figure 12:
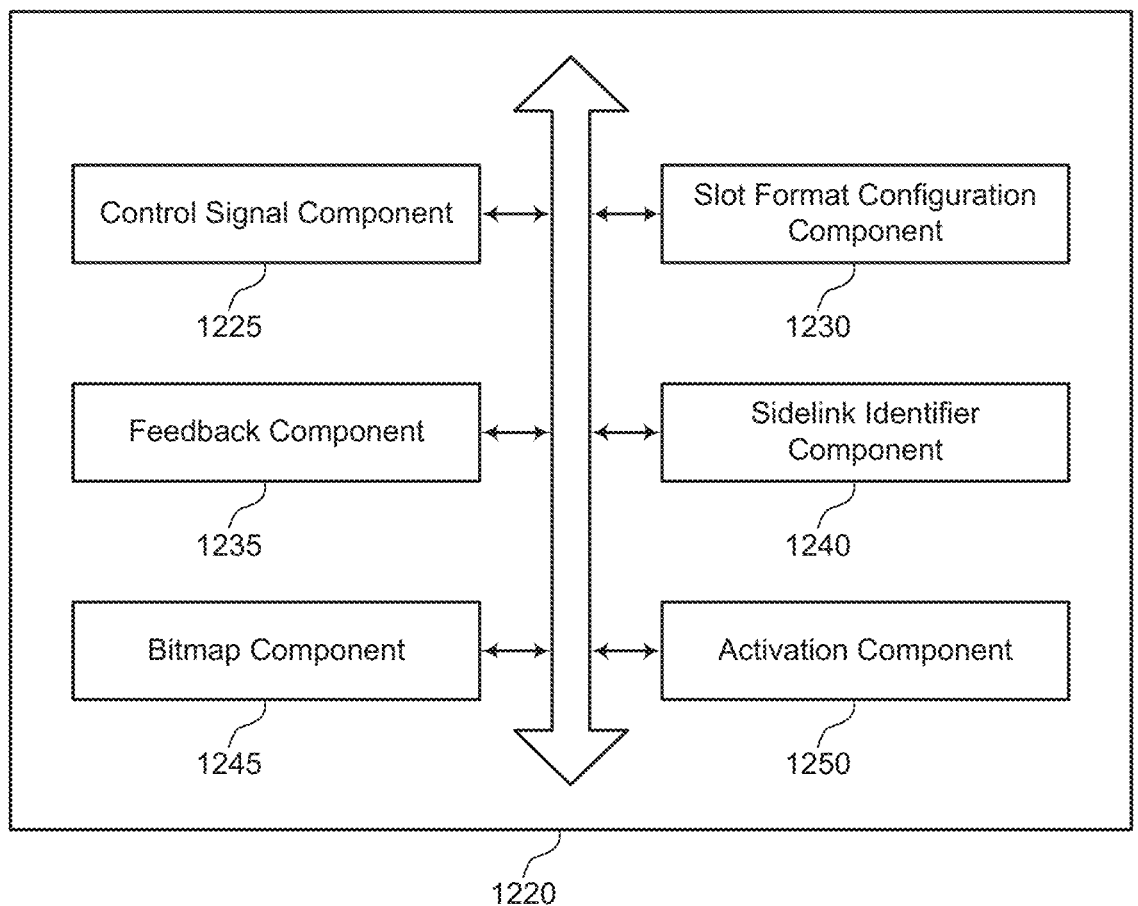
FIG. 12 shows a block diagram of a communications manager that supports enhanced sidelink slot format configuration in accordance with aspects of the present disclosure.

FIG. 12 shows a block diagram of a communications manager 1220 that supports enhanced sidelink slot format configuration in accordance with aspects of the present disclosure. The communications manager 1220, or various components thereof, may be an example of means for performing various aspects of enhanced sidelink slot format configuration. For example, the communications manager 1220 may include a control signal component 1225, a slot format configuration component 1230, a feedback component 1235, a sidelink identifier component 1240, a bitmap component 1245, an activation component 1250, or any combination thereof. Each of these components may communicate, directly or indirectly, with one another (for example, via one or more buses).

The communications manager 1220 may support wireless communication at a base station in accordance with examples as disclosed herein. The control signal component 1225 may be configured as or otherwise support a means for transmitting, to a UE, a control signal indicating a set of durations, in which a duration of the set of durations is scheduled for uplink resources and additional resources. The slot format configuration component 1230 may be configured as or otherwise support a means for transmitting, to the UE, an indication of a slot format configuration permitting sidelink communications on the uplink resources during the duration scheduled for the uplink resources and the additional resources. The feedback component 1235 may be configured as or otherwise support a means for receiving, from the UE, feedback information based on transmitting a sidelink transmission using the uplink resources and during the duration.

In some examples, to support transmitting the indication of the slot format configuration, the slot format configuration component 1230 may be configured as or otherwise support a means for transmitting, to a set of UEs, an indication of a common slot format configuration permitting the sidelink communications on a subset of the set of durations including the duration based on an uplink bandwidth scheduled for the subset of the set of durations satisfying a sidelink bandwidth threshold, in which the set of UEs includes the UE.

In some examples, the sidelink identifier component 1240 may be configured as or otherwise support a means for receiving, from the UE, an indication of a set of multiple sidelink identifiers associated with a set of UEs including the UE and a second UE, in which transmitting the indication of the slot format configuration is based on the indication of the set of multiple sidelink identifiers.

In some examples, the to support transmitting the indication of the slot format configuration, the slot format configuration component 1230 may be configured as or otherwise support a means for transmitting, to the UE, an indication of a common slot format configuration for a first set of feedback occasions and an indication of a dedicated slot format configuration for a second set of feedback occasions.

In some examples, the bitmap component 1245 may be configured as or otherwise support a means for transmitting an indication of a bitmap identifying the duration scheduled for the uplink resources and the additional resources, in which the sidelink transmission using the uplink resources and during the duration is based on the bitmap identifying the duration. In some examples, the additional resources include downlink resources or flexible resources.

In some examples, the slot format configuration component 1230 may be configured as or otherwise support a means for transmitting, to the UE, a scheduling downlink control information and a slot format indicator permitting the sidelink communications during the duration scheduled for the uplink resources and the additional resources, in which the sidelink transmission during the duration is based on the slot format indicator.

In some examples, the activation component 1250 may be configured as or otherwise support a means for an indication to change an activation status of the additional resources, in which the sidelink transmission is based on the indication to change the activation status of sidelink resources.

Figure 13:
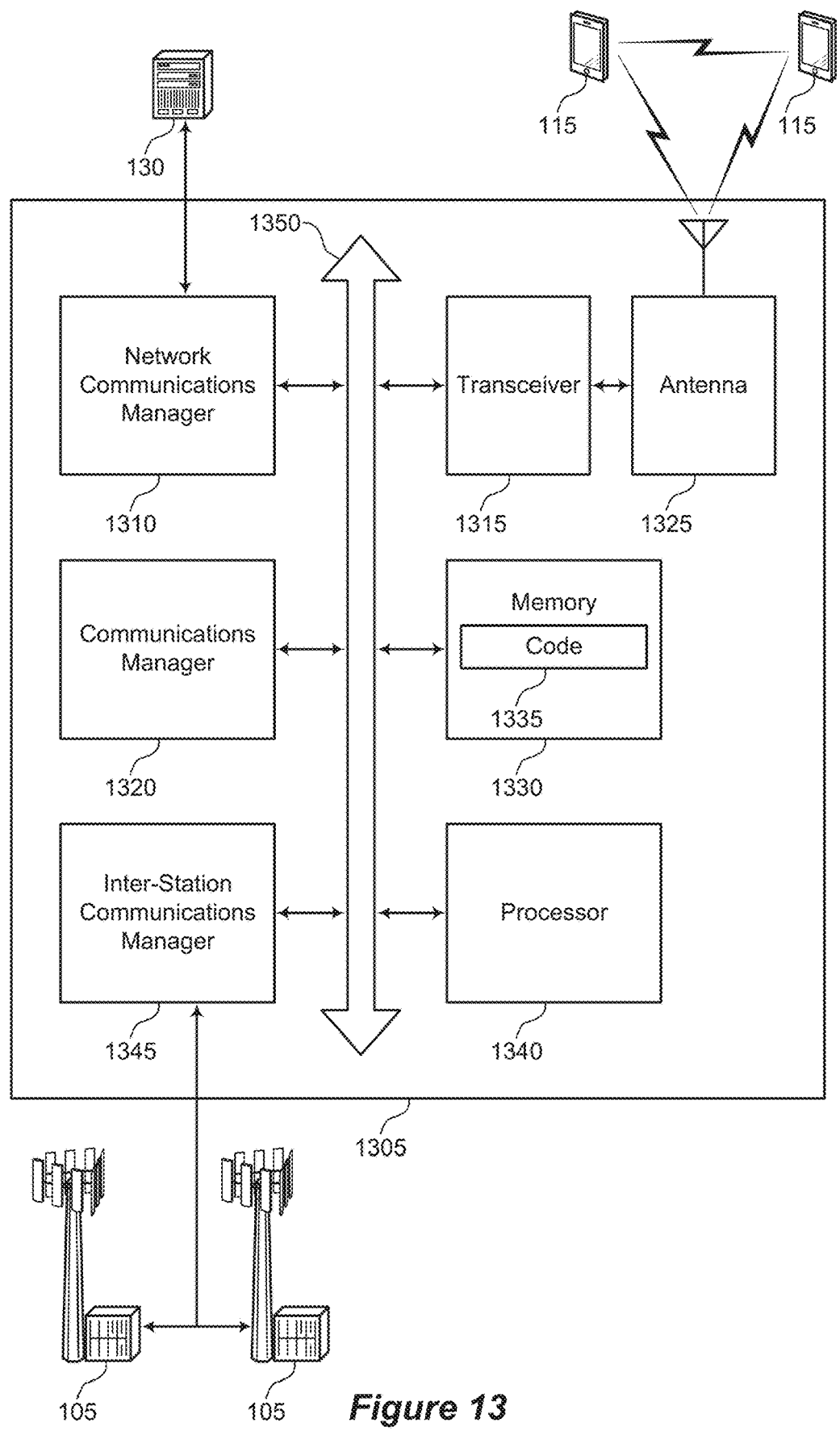
FIG. 13 shows a diagram of a system including a device that supports enhanced sidelink slot format configuration in accordance with aspects of the present disclosure.

FIG. 13 shows a diagram of a system including a device 1305 that supports enhanced sidelink slot format configuration in accordance with aspects of the present disclosure. The device 1305 may be an example of or include the components of a device 1005, a device 1105, or a base station 105. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (for example, operatively, communicatively, functionally, electronically, electrically) via one or more buses (for example, a bus 1350).

The network communications manager 1310 may manage communications with a core network 130 (for example, via one or more wired backhaul links). For example, the network communications manager 1310 may manage the transfer of data communications for client devices, such as one or more UEs 115.

In some examples, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some examples, the code 1335 may not be directly executable by the processor 1340 but may cause a computer (for example, when compiled and executed) to perform functions described herein. In some examples, the memory 1330 may contain, among other things, a BIOS which may control basic hardware or software operation such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some other cases, a memory controller may be integrated into the processor 1340. The processor 1340 may be configured to execute computer-readable instructions stored in a memory (for example, the memory 1330) to cause the device 1305 to perform various functions (for example, functions or tasks supporting enhanced sidelink slot format configuration). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, a control signal indicating a set of durations, in which a duration of the set of durations is scheduled for uplink resources and additional resources. The communications manager 1320 may be configured as or otherwise support a means for transmitting, to the UE, an indication of a slot format configuration permitting sidelink communications on the uplink resources during the duration scheduled for the uplink resources and the additional resources. The communications manager 1320 may be configured as or otherwise support a means for receiving, from the UE, feedback information based on transmitting a sidelink transmission using the uplink resources and during the duration.

By including or configuring the communications manager 1320 in accordance with examples, the device 1305 may support techniques for improved communication reliability, reduced latency, improved user experience related to reduced processing, reduced power consumption, more efficient utilization of communication resources, longer battery life, and improved utilization of processing capability.

In some examples, the communications manager 1320 may be configured to perform various operations (for example, receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of enhanced sidelink slot format configuration, or the processor 1340 and the memory 1330 may be otherwise configured to perform or support such operations.

Figure 14:
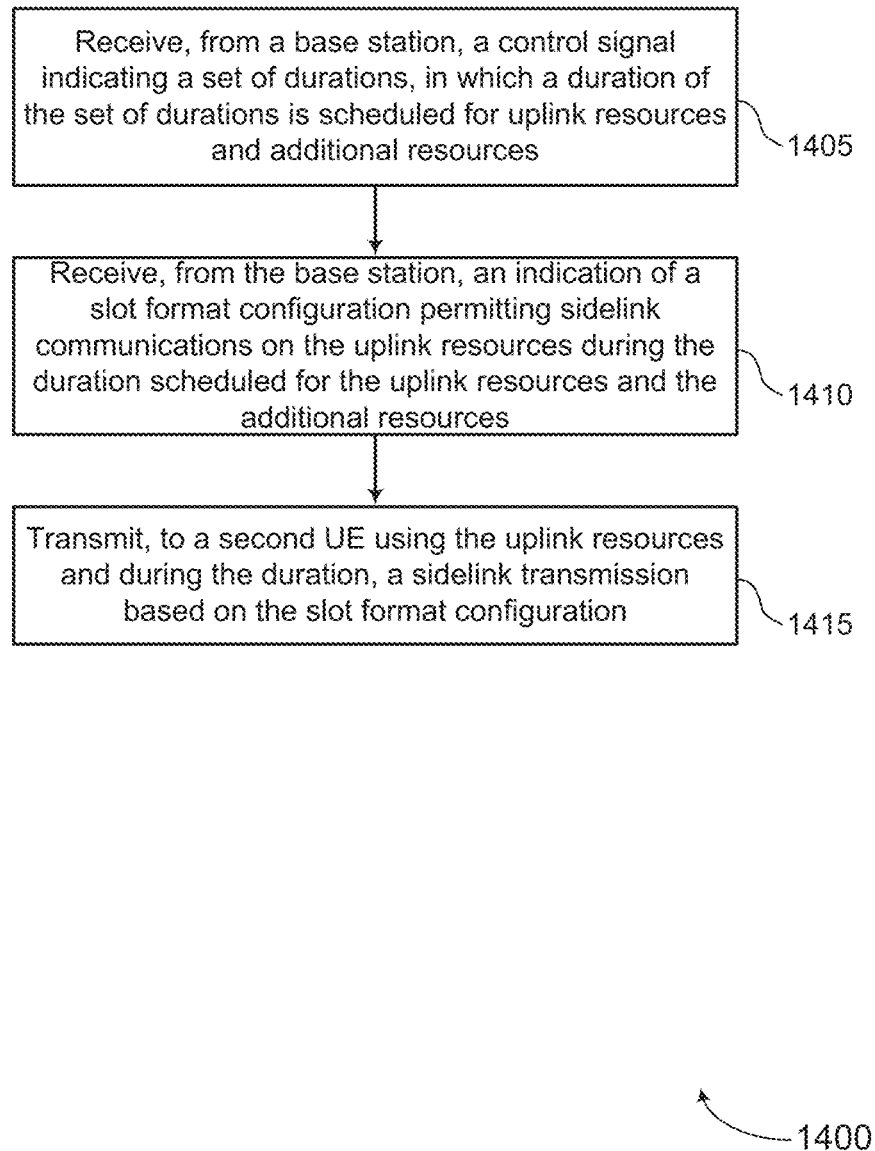
FIGS. 14-17 show flowcharts illustrating methods that support enhanced sidelink slot format configuration in accordance with aspects of the present disclosure.

FIG. 14 shows a flowchart illustrating a method 1400 that supports enhanced sidelink slot format configuration in accordance with aspects of the present disclosure. The operations of the method 1400 may be implemented by a UE or its components. For example, the operations of the method 1400 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a control signal indicating a set of durations, in which a duration of the set of durations is scheduled for uplink resources and additional resources. The operations of 1405 may be performed in accordance with examples as disclosed herein. In some examples, aspects of the operations of 1405 may be performed by a control signal component 825 as described with reference to FIG. 8.

At 1410, the method may include receiving, from the base station, an indication of a slot format configuration permitting sidelink communications on the uplink resources during the duration scheduled for the uplink resources and the additional resources. The operations of 1410 may be performed in accordance with examples as disclosed herein. In some examples, aspects of the operations of 1410 may be performed by a slot format configuration component 830 as described with reference to FIG. 8.

At 1415, the method may include transmitting, to a second UE using the uplink resources and during the duration, a sidelink transmission based on the slot format configuration. The operations of 1415 may be performed in accordance with examples as disclosed herein. In some examples, aspects of the operations of 1415 may be performed by a sidelink transmission component 835 as described with reference to FIG. 8.

Figure 15:
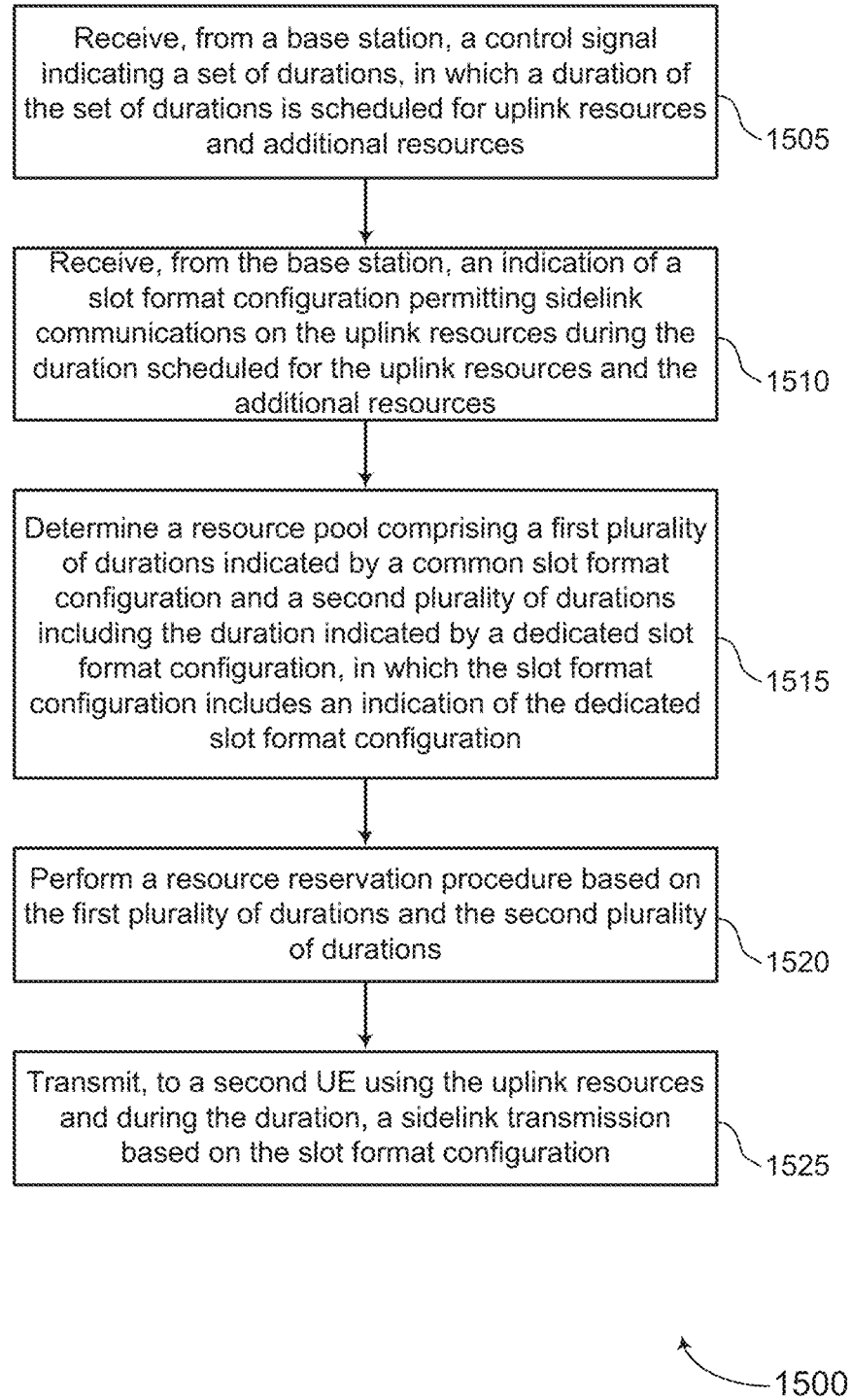

FIG. 15 shows a flowchart illustrating a method 1500 that supports enhanced sidelink slot format configuration in accordance with aspects of the present disclosure. The operations of the method 1500 may be implemented by a UE or its components. For example, the operations of the method 1500 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a control signal indicating a set of durations, in which a duration of the set of durations is scheduled for uplink resources and additional resources. The operations of 1505 may be performed in accordance with examples as disclosed herein. In some examples, aspects of the operations of 1505 may be performed by a control signal component 825 as described with reference to FIG. 8.

At 1510, the method may include receiving, from the base station, an indication of a slot format configuration permitting sidelink communications on the uplink resources during the duration scheduled for the uplink resources and the additional resources. The operations of 1510 may be performed in accordance with examples as disclosed herein. In some examples, aspects of the operations of 1510 may be performed by a slot format configuration component 830 as described with reference to FIG. 8.

At 1515, the method may include determining a resource pool including a first set of multiple durations indicated by a common slot format configuration and a second set of multiple durations including the duration indicated by a dedicated slot format configuration, in which the slot format configuration includes an indication of the dedicated slot format configuration. The operations of 1515 may be performed in accordance with examples as disclosed herein. In some examples, aspects of the operations of 1515 may be performed by a resource pool component 855 as described with reference to FIG. 8.

At 1520, the method may include performing a resource reservation procedure based on the first set of multiple durations and the second set of multiple durations. The operations of 1520 may be performed in accordance with examples as disclosed herein. In some examples, aspects of the operations of 1520 may be performed by a resource reservation component 860 as described with reference to FIG. 8.

At 1525, the method may include transmitting, to a second UE using the uplink resources and during the duration, a sidelink transmission based on the slot format configuration. The operations of 1525 may be performed in accordance with examples as disclosed herein. In some examples, aspects of the operations of 1525 may be performed by a sidelink transmission component 835 as described with reference to FIG. 8.

Figure 16:
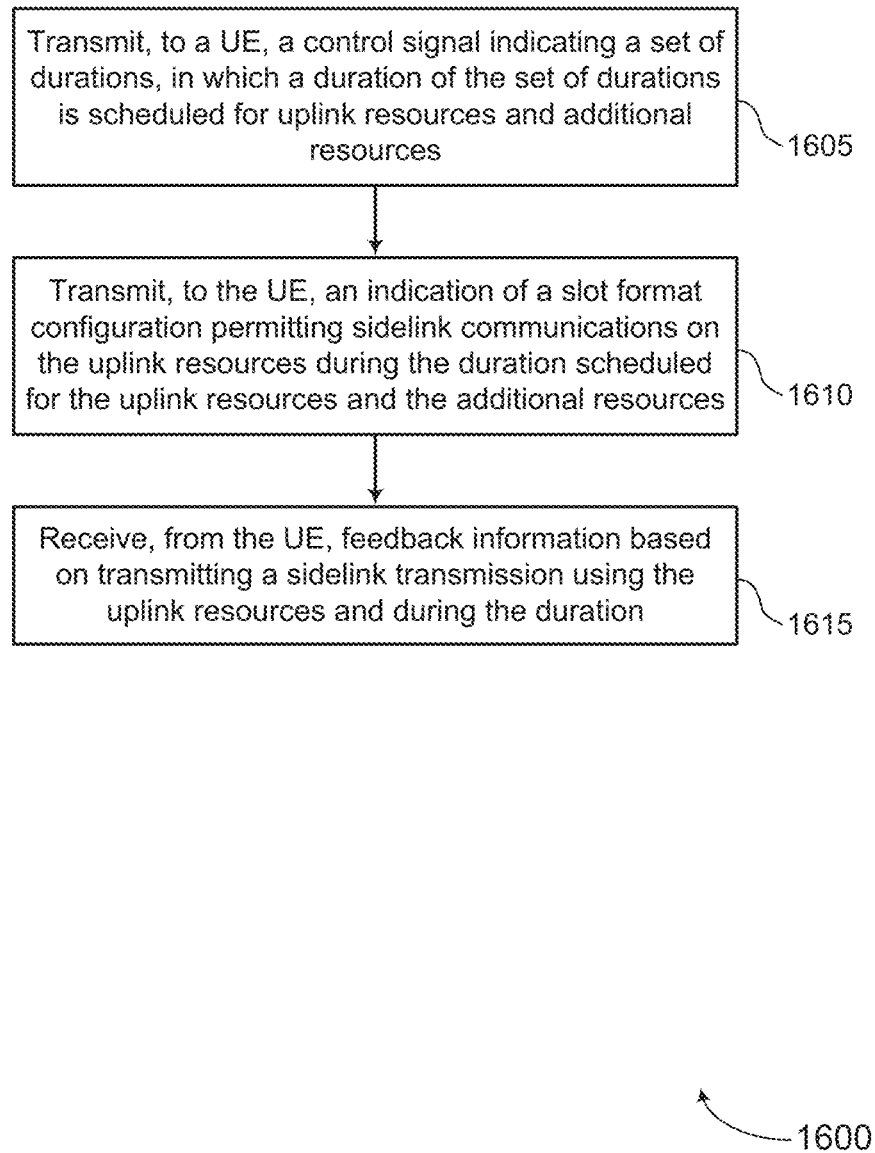

FIG. 16 shows a flowchart illustrating a method 1600 that supports enhanced sidelink slot format configuration in accordance with aspects of the present disclosure. The operations of the method 1600 may be implemented by a base station or its components. For example, the operations of the method 1600 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a control signal indicating a set of durations, in which a duration of the set of durations is scheduled for uplink resources and additional resources. The operations of 1605 may be performed in accordance with examples as disclosed herein. In some examples, aspects of the operations of 1605 may be performed by a control signal component 1225 as described with reference to FIG. 12.

At 1610, the method may include transmitting, to the UE, an indication of a slot format configuration permitting sidelink communications on the uplink resources during the duration scheduled for the uplink resources and the additional resources. The operations of 1610 may be performed in accordance with examples as disclosed herein. In some examples, aspects of the operations of 1610 may be performed by a slot format configuration component 1230 as described with reference to FIG. 12.

At 1615, the method may include receiving, from the UE, feedback information based on transmitting a sidelink transmission using the uplink resources and during the duration. The operations of 1615 may be performed in accordance with examples as disclosed herein. In some examples, aspects of the operations of 1615 may be performed by a feedback component 1235 as described with reference to FIG. 12.

Figure 17:
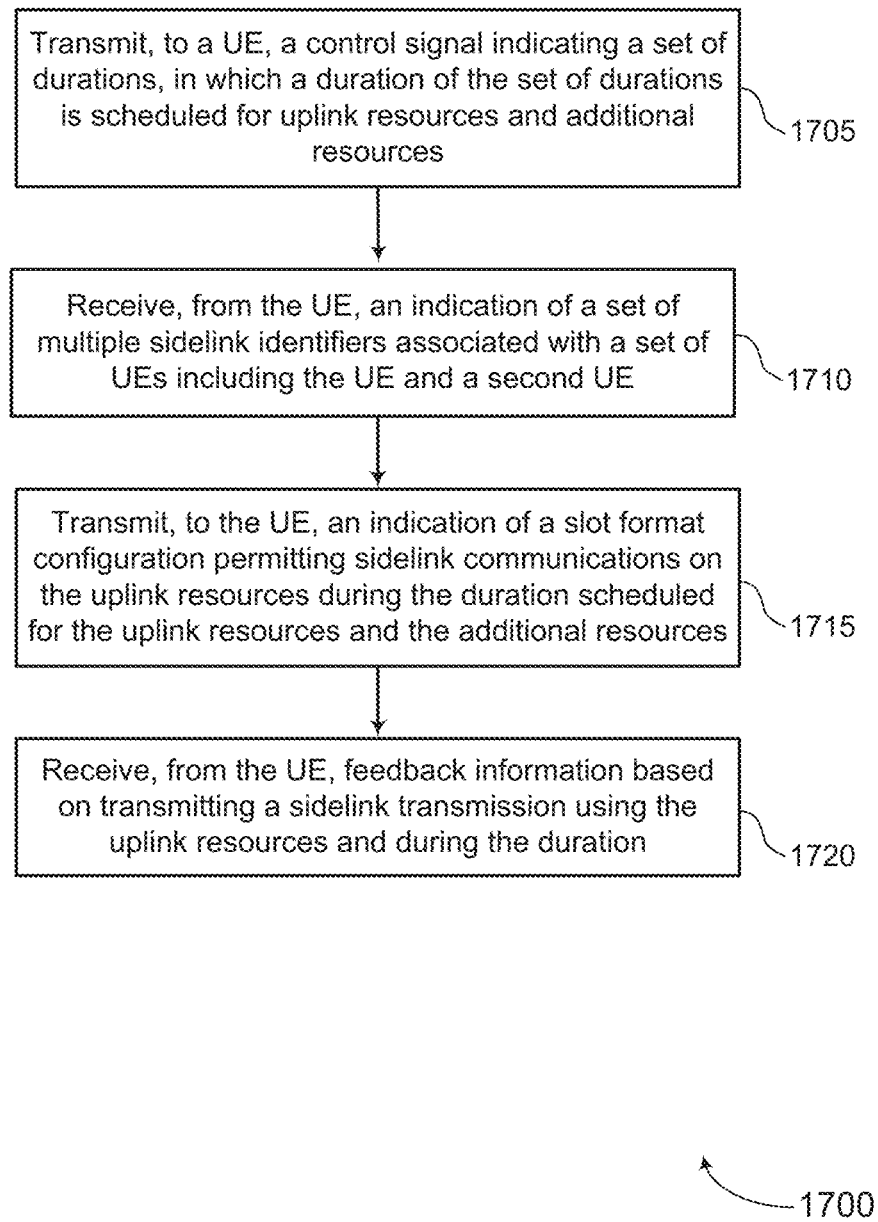

FIG. 17 shows a flowchart illustrating a method 1700 that supports enhanced sidelink slot format configuration in accordance with aspects of the present disclosure. The operations of the method 1700 may be implemented by a base station or its components. For example, the operations of the method 1700 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a control signal indicating a set of durations, in which a duration of the set of durations is scheduled for uplink resources and additional resources. The operations of 1705 may be performed in accordance with examples as disclosed herein. In some examples, aspects of the operations of 1705 may be performed by a control signal component 1225 as described with reference to FIG. 12.

At 1710, the method may include receiving, from the UE, an indication of a set of multiple sidelink identifiers associated with a set of UEs including the UE and a second UE. The operations of 1710 may be performed in accordance with examples as disclosed herein. In some examples, aspects of the operations of 1710 may be performed by a sidelink identifier component 1240 as described with reference to FIG. 12.

At 1715, the method may include transmitting, to the UE, an indication of a slot format configuration permitting sidelink communications on the uplink resources during the duration scheduled for the uplink resources and the additional resources. In some examples, transmitting the indication of the slot format configuration is based on the indication of the set of multiple sidelink identifiers. The operations of 1715 may be performed in accordance with examples as disclosed herein. In some examples, aspects of the operations of 1715 may be performed by a slot format configuration component 1230 as described with reference to FIG. 12.

At 1720, the method may include receiving, from the UE, feedback information based on transmitting a sidelink transmission using the uplink resources and during the duration. The operations of 1720 may be performed in accordance with examples as disclosed herein. In some examples, aspects of the operations of 1720 may be performed by a feedback component 1235 as described with reference to FIG. 12.

The following provides an overview of aspects of the present disclosure:

Aspect 1: A method for wireless communication at a first UE, comprising: receiving, from a base station, a control signal indicating a set of durations, wherein a duration of the set of durations is scheduled for uplink resources and additional resources; receiving, from the base station, an indication of a slot format configuration permitting sidelink communications on the uplink resources during the duration scheduled for the uplink resources and the additional resources; and transmitting, to a second UE using the uplink resources and during the duration, a sidelink transmission based at least in part on the slot format configuration.

Aspect 2: The method of aspect 1, wherein receiving the indication of the slot format configuration further comprises: receiving, from the base station, an indication of a common slot format configuration permitting the sidelink communications on a subset of the set of durations including the duration based at least in part on an uplink bandwidth scheduled for the subset of the set of durations satisfying a sidelink bandwidth threshold.

Aspect 3: The method of any of aspects 1 through 2, further comprising: transmitting, to the base station, an indication of a plurality of sidelink identifiers associated with a set of UEs comprising the first UE and the second UE, wherein receiving the indication of the slot format configuration is based at least in part on the indication of the plurality of sidelink identifiers.

Aspect 4: The method of any of aspects 1 through 3, wherein receiving the indication of the slot format configuration further comprises: receiving, from the base station, an indication of a common slot format configuration for a first set of feedback occasions and an indication of a dedicated slot format configuration for a second set of feedback occasion; and further comprising: transmitting, to the second UE, feedback information on the first set of feedback occasions and the second set of feedback occasions.

Aspect 5: The method of any of aspects 1 through 4, further comprising: receiving an indication of a bitmap identifying the duration scheduled for the uplink resources and the additional resources, wherein transmitting the sidelink transmission using the uplink resources and during the duration is based at least in part on the bitmap identifying the duration.

Aspect 6: The method of any of aspects 1 through 5, further comprising: determining a resource pool comprising a first plurality of durations indicated by a common slot format configuration and a second plurality of durations including the duration indicated by a dedicated slot format configuration, wherein the slot format configuration comprises an indication of the dedicated slot format configuration; and performing a resource reservation procedure based at least in part on the first plurality of durations and the second plurality of durations.

Aspect 7: The method of aspect 6, wherein the resource reservation procedure is based at least in part on a connection type or a duration type, or both.

Aspect 8: The method of any of aspects 6 through 7, further comprising: refraining, during the second plurality of durations, from reserving resources scheduled during at least one duration of the first plurality of durations.

Aspect 9: The method of any of aspects 6 through 8, wherein a total number of durations in the resource pool is fixed.

Aspect 10: The method of any of aspects 1 through 9, wherein the additional resources comprise downlink resources or flexible resources.

Aspect 11: The method of aspect 10, further comprising: determining resource reservations on a plurality of dynamic resources scheduled for a number of durations indicated by a slot format indicator, wherein transmitting the sidelink transmission during the duration is based at least in part on the resource reservations.

Aspect 12: The method of any of aspects 1 through 11, further comprising: receiving, from the base station, a scheduling downlink control information and a slot format indicator permitting the sidelink communications during the duration scheduled for the uplink resources and the additional resources, wherein transmitting the sidelink transmission during the duration is based at least in part on the slot format indicator.

Aspect 13: The method of any of aspects 1 through 12, further comprising: receiving, from the base station, an indication to change an activation status of the additional resources, wherein transmitting the sidelink transmission is based at least in part on receiving the indication to change the activation status of the additional resources.

Aspect 14: The method of any of aspects 1 through 13, further comprising: determining a resource pool for the duration associated with a sub-channel, wherein transmitting the sidelink transmission during the duration is based at least in part on the resource pool.

Aspect 15: The method of aspect 14, wherein the resource pool comprises non-contiguous sub-channels in the set of durations.

Aspect 16: The method of any of aspects 14 through 15, further comprising: determining a second resource pool comprising a second set of durations, wherein the resource pool and the second resource pool each comprises a number of contiguous sidelink sub-channels.

Aspect 17: The method of any of aspects 14 through 16, wherein the resource pool is associated with the uplink resources and a second resource pool is associated with the additional resources, the resource pool being non-contiguous with the second resource pool.

Aspect 18: A method for wireless communication at a base station, comprising: transmitting, to a UE, a control signal indicating a set of durations, wherein a duration of the set of durations is scheduled for uplink resources and additional resources; transmitting, to the UE, an indication of a slot format configuration permitting sidelink communications on the uplink resources during the duration scheduled for the uplink resources and the additional resources; and receiving, from the UE, feedback information based at least in part on transmitting a sidelink transmission using the uplink resources and during the duration.

Aspect 19: The method of aspect 18, wherein transmitting the indication of the slot format configuration further comprises transmitting, to a set of UEs, an indication of a common slot format configuration permitting the sidelink communications on a subset of the set of durations including the duration based at least in part on an uplink bandwidth scheduled for the subset of the set of durations satisfying a sidelink bandwidth threshold, wherein the set of UEs includes the UE.

Aspect 20: The method of any of aspects 18 through 19, further comprising: receiving, from the UE, an indication of a plurality of sidelink identifiers associated with a set of UEs comprising the UE and a second UE, wherein transmitting the indication of the slot format configuration is based at least in part on the indication of the plurality of sidelink identifiers.

Aspect 21: The method of any of aspects 18 through 20, wherein transmitting the indication of the slot format configuration further comprises transmitting, to the UE, an indication of a common slot format configuration for a first set of feedback occasions and an indication of a dedicated slot format configuration for a second set of feedback occasions.

Aspect 22: The method of any of aspects 18 through 21, further comprising: transmitting an indication of a bitmap identifying the duration scheduled for the uplink resources and the additional resources, wherein the sidelink transmission using the uplink resources and during the duration is based at least in part on the bitmap identifying the duration.

Aspect 23: The method of any of aspects 18 through 22, wherein the additional resources comprise downlink resources or flexible resources.

Aspect 24: The method of any of aspects 18 through 23, further comprising: transmitting, to the UE, a scheduling downlink control information and a slot format indicator permitting the sidelink communications during the duration scheduled for the uplink resources and the additional resources, wherein the sidelink transmission during the duration is based at least in part on the slot format indicator.

Aspect 25: The method of any of aspects 18 through 24, further comprising: transmitting, to the UE, an indication to change an activation status of the additional resources, wherein the sidelink transmission is based at least in part on the indication to change the activation status of sidelink resources.

Aspect 26: An apparatus for wireless communication at a first UE, comprising a processor; memory coupled with the processor; and instructions stored in the memory and executable by the processor to cause the apparatus to perform a method of any of aspects 1 through 17.

Aspect 27: An apparatus for wireless communication at a first UE, comprising at least one means for performing a method of any of aspects 1 through 17.

Aspect 28: A non-transitory computer-readable medium storing code for wireless communication at a first UE, the code comprising instructions executable by a processor to perform a method of any of aspects 1 through 17.

Aspect 29: An apparatus for wireless communication at a base station, comprising a processor; memory coupled with the processor; and instructions stored in the memory and executable by the processor to cause the apparatus to perform a method of any of aspects 18 through 25.

Aspect 30: An apparatus for wireless communication at a base station, comprising at least one means for performing a method of any of aspects 18 through 25.

Aspect 31: A non-transitory computer-readable medium storing code for wireless communication at a base station, the code comprising instructions executable by a processor to perform a method of any of aspects 18 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), and ascertaining among other examples. Also, "determining" can include receiving (such as receiving information), and accessing (such as accessing data in a memory) among other examples. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from a base station, a control signal indicating a set of durations, wherein a duration of the set of durations is scheduled for uplink resources and additional resources;
   receiving, from the base station, an indication of a slot format configuration permitting sidelink communications on the uplink resources during the duration scheduled for the uplink resources and the additional resources; and
   transmitting, to a second UE using the uplink resources and during the duration, a sidelink transmission based at least in part on the slot format configuration.

2. The method of claim 1, wherein receiving the indication of the slot format configuration further comprises receiving, from the base station, an indication of a common slot format configuration permitting the sidelink communications on a subset of the set of durations including the duration based at least in part on an uplink bandwidth scheduled for the subset of the set of durations satisfying a sidelink bandwidth threshold.

3. The method of claim 1, further comprising transmitting, to the base station, an indication of a plurality of sidelink identifiers associated with a set of UEs comprising the first UE and the second UE, wherein receiving the indication of the slot format configuration is based at least in part on the indication of the plurality of sidelink identifiers.

4. The method of claim 1, wherein receiving the indication of the slot format configuration further comprises receiving, from the base station, an indication of a common slot format configuration for a first set of feedback occasions and an indication of a dedicated slot format configuration for a second set of feedback occasions, and wherein the method further comprises:
   transmitting, to the second UE, feedback information on the first set of feedback occasions and the second set of feedback occasions.

5. The method of claim 1, further comprising receiving an indication of a bitmap identifying the duration scheduled for the uplink resources and the additional resources, wherein transmitting the sidelink transmission using the uplink resources and during the duration is based at least in part on the bitmap identifying the duration.

6. The method of claim 1, further comprising:
   determining a resource pool comprising a first plurality of durations indicated by a common slot format configuration and a second plurality of durations, including the duration, indicated by a dedicated slot format configuration, wherein the slot format configuration comprises an indication of the dedicated slot format configuration; and
   performing a resource reservation procedure based at least in part on the first plurality of durations and the second plurality of durations.

7. The method of claim 6, wherein the resource reservation procedure is based at least in part on a connection type or a duration type, or both.

8. The method of claim 6, further comprising refraining, during the second plurality of durations, from reserving resources scheduled during at least one duration of the first plurality of durations.

9. The method of claim 6, wherein a total number of durations in the resource pool is fixed.

10. The method of claim 1, wherein the additional resources comprise downlink resources or flexible resources.

11. The method of claim 1, further comprising determining resource reservations on a plurality of dynamic resources scheduled for a number of durations indicated by a slot format indicator, wherein transmitting the sidelink transmission during the duration is based at least in part on the resource reservations.

12. The method of claim 1, further comprising receiving, from the base station, a scheduling downlink control information and a slot format indicator permitting the sidelink communications during the duration scheduled for the uplink resources and the additional resources, wherein transmitting the sidelink transmission during the duration is based at least in part on the slot format indicator.

13. The method of claim 1, further comprising receiving, from the base station, an indication to change an activation status of the additional resources, wherein transmitting the sidelink transmission is based at least in part on receiving the indication to change the activation status of the additional resources.

14. The method of claim 1, further comprising determining a resource pool for the duration associated with a sub-channel, wherein transmitting the sidelink transmission during the duration is based at least in part on the resource pool.

15. The method of claim 14, wherein the resource pool comprises non-contiguous sub-channels in the set of durations.

16. The method of claim 14, further comprising determining a second resource pool comprising a second set of durations, wherein the resource pool and the second resource pool each comprises a number of contiguous sidelink sub-channels.

17. The method of claim 14, wherein the resource pool is associated with the uplink resources and a second resource pool is associated with the additional resources, the resource pool being non-contiguous with the second resource pool.

18. A method for wireless communication at a base station, comprising:
    transmitting, to a user equipment (UE), a control signal indicating a set of durations, wherein a duration of the set of durations is scheduled for uplink resources and additional resources;
    transmitting, to the UE, an indication of a slot format configuration permitting sidelink communications on the uplink resources during the duration scheduled for the uplink resources and the additional resources; and
    receiving, from the UE, feedback information based at least in part on transmitting a sidelink transmission using the uplink resources and during the duration.

19. The method of claim 18, wherein transmitting the indication of the slot format configuration further comprises transmitting, to a set of UEs, an indication of a common slot format configuration permitting the sidelink communications on a subset of the set of durations including the duration based at least in part on an uplink bandwidth scheduled for the subset of the set of durations satisfying a sidelink bandwidth threshold, wherein the set of UEs includes the UE.

20. The method of claim 18, further comprising receiving, from the UE, an indication of a plurality of sidelink identifiers associated with a set of UEs comprising the UE and a second UE, wherein transmitting the indication of the slot format configuration is based at least in part on the indication of the plurality of sidelink identifiers.

21. The method of claim 18, wherein transmitting the indication of the slot format configuration further comprises transmitting, to the UE, an indication of a common slot format configuration for a first set of feedback occasions and an indication of a dedicated slot format configuration for a second set of feedback occasions.

22. The method of claim 18, further comprising transmitting an indication of a bitmap identifying the duration scheduled for the uplink resources and the additional resources, wherein the sidelink transmission using the uplink resources and during the duration is based at least in part on the bitmap identifying the duration.

23. The method of claim 18, wherein the additional resources comprise downlink resources or flexible resources.

24. The method of claim 18, further comprising transmitting, to the UE, a scheduling downlink control information and a slot format indicator permitting the sidelink communications during the duration scheduled for the uplink resources and the additional resources, wherein the sidelink transmission during the duration is based at least in part on the slot format indicator.

25. The method of claim 18, further comprising transmitting, to the UE, an indication to change an activation status of the additional resources, wherein the sidelink transmission is based at least in part on the indication to change the activation status of sidelink resources.

26. An apparatus for wireless communication at a first user equipment (UE), comprising:
    a processor;
    memory coupled with the processor; and
    instructions stored in the memory and executable by the processor to cause the apparatus to:
        receive, from a base station, a control signal indicating a set of durations, wherein a duration of the set of durations is scheduled for uplink resources and additional resources;
        receive, from the base station, an indication of a slot format configuration permitting sidelink communications on the uplink resources during the duration scheduled for the uplink resources and the additional resources; and
        transmit, to a second UE using the uplink resources and during the duration, a sidelink transmission based at least in part on the slot format configuration.

27. The apparatus of claim 26, wherein the instructions to receive the indication of the slot format configuration are further executable by the processor to cause the apparatus to:
    receive, from the base station, an indication of a common slot format configuration permitting the sidelink communications on a subset of the set of durations including the duration based at least in part on an uplink bandwidth scheduled for the subset of the set of durations satisfying a sidelink bandwidth threshold.

28. The apparatus of claim 26, wherein the instructions are further executable by the processor to cause the apparatus to transmit, to the base station, an indication of a plurality of sidelink identifiers associated with a set of UEs comprising the first UE and the second UE, wherein receiving the indication of the slot format configuration is based at least in part on the indication of the plurality of sidelink identifiers.

29. An apparatus for wireless communication at a base station, comprising:
    a processor;
    memory coupled with the processor; and
    instructions stored in the memory and executable by the processor to cause the apparatus to:

transmit, to a user equipment (UE), a control signal indicating a set of durations, wherein a duration of the set of durations is scheduled for uplink resources and additional resources;

transmit, to the UE, an indication of a slot format configuration permitting sidelink communications on the uplink resources during the duration scheduled for the uplink resources and the additional resources; and receive, from the UE, feedback information based at least in part on transmitting a sidelink transmission using the uplink resources and during the duration.

30. The apparatus of claim 29, wherein the instructions to transmit the indication of the slot format configuration are further executable by the processor to cause the apparatus to transmit, to a set of UEs, an indication of a common slot format configuration permitting the sidelink communications on a subset of the set of durations including the duration based at least in part on an uplink bandwidth scheduled for the subset of the set of durations satisfying a sidelink bandwidth threshold, wherein the set of UEs includes the UE.

* * * * *